United States Patent [19]

Kondo

[11] Patent Number: 5,627,581

[45] Date of Patent: May 6, 1997

[54] ENCODING APPARATUS AND ENCODING METHOD

[75] Inventor: Tetsujiro Kondo, Kanagawa, Japan

[73] Assignee: Sony Corporation, Tokyo, Japan

[21] Appl. No.: 379,558

[22] PCT Filed: Jun. 7, 1994

[86] PCT No.: PCT/JP94/00921

§ 371 Date: Mar. 29, 1995

§ 102(e) Date: Mar. 29, 1995

[87] PCT Pub. No.: WO94/30013

PCT Pub. Date: Dec. 22, 1994

[30] Foreign Application Priority Data

Jun. 8, 1993 [JP] Japan ..................... 5-164029

[51] Int. Cl.$^6$ ..................... H04N 7/26
[52] U.S. Cl. .............. 348/17; 348/390; 364/514 R
[58] Field of Search .................. 364/514 R, 514 A; 348/17, 384, 385, 387, 390, 423, 571, 575; 370/82, 83, 84, 112, 118; 382/232, 236, 239; 281/29, 30, 33

[56] References Cited

U.S. PATENT DOCUMENTS

| 4,541,008 | 9/1985 | Fishman et al. ............. 370/112 |
| 4,868,653 | 9/1989 | Golin et al. ............... 348/390 |
| 4,907,087 | 3/1990 | Schreiber et al. ........... 348/724 |
| 5,151,941 | 9/1992 | Nishiguchi et al. ........... 381/46 |
| 5,231,492 | 7/1993 | Dangi et al. ................ 348/17 |
| 5,309,290 | 5/1994 | Sugiyama et al. ............. 360/32 |
| 5,455,684 | 10/1995 | Fujinami et al. ............ 348/390 |
| 5,500,672 | 3/1996 | Fujii ....................... 348/17 |
| 5,550,581 | 8/1996 | Zhou ........................ 348/17 |

FOREIGN PATENT DOCUMENTS

| 0515101 | 11/1992 | European Pat. Off. . |
| 59-61286 | 4/1984 | Japan . |
| 3-58582 | 3/1991 | Japan . |
| 04360481 | 12/1992 | Japan . |

OTHER PUBLICATIONS

Sato, Yoichi, "Multiplicating Characteristics of Multimedia Signal in High–Speed Burst Multiple Transmitting System", *IEICE Thesis Journal*, vol. J72–B–I, No. 11, Nov. 1989, pp. 1112–1119.

*Primary Examiner*—Hassan Kizou
*Attorney, Agent, or Firm*—William S. Frommer; Alvin Sinderbrand

[57] ABSTRACT

The characteristic of a digital video signal is detected by first characteristic detecting circuit, and the characteristic of a digital speech signal is detected by second characteristic circuit. Outputs of the first and second characteristic detecting circuit are synthesized by synthesizing circuit to control allocated information quantities of compression encoding of the digital video signal and the digital speech signal on the basis of an output of the synthesizing circuit, thereby making it possible to more efficiently compression-encode video signal and speech signal related thereto in the state of less degradation from a viewpoint of visual and auditory senses at the time of reproduction.

12 Claims, 13 Drawing Sheets

ENCODING APPARATUS AND ENCODING METHOD

TECHNICAL FIELD

This invention relates to an encoding apparatus and an encoding method for efficiently compression-encoding video signals and speech signals.

BACKGROUND ART

Hitherto, various systems of efficiently compression-encoding video signals or speech signals to transmit encoded signals have been proposed. In these conventional compression encoding systems, with respect to respective signals of video signals and speech signals, compression encoding processing are carried out on the basis of respective masking effects so that signal degradation does not conspicuous.

Meanwhile, compression encoding systems as mentioned above are in conformity with respective sensitivity characteristics (masking characteristics) of the hearing sense and the visual sense of the human being. In all the systems, compression processing are independently carried out with reproduced picture and reproduced sound being individually considered to be evaluated.

For example, when only picture is evaluated in the state where sound is interrupted, since it is important to allow conspicuous degradation such as jerkiness or block distortion, etc. of picture to be as minimum as possible, compression encoding processing is carried out laying stress upon that point.

However, in entertainments such as video or video software, etc., pictures and sounds are simultaneously reproduced, and these reproduced pictures and sounds synthetically give stimulus to the human being. For this reason, in the case where, e.g., sound related to picture simultaneously exists, there are many instances where severe degradation of picture like jerkiness of picture mentioned above is practically masked and is not felt. Particularly, at the portion in which interest (attention) of the human being is mainly paid upon sound (the portion where stimulation level (activity) of sound is high), attention on picture is distracted, resulting in high possibility that severe degradation as described above of picture might not be felt in most cases.

Phenomenon as mentioned above similarly applies to sound. In the case where level (degree) of stimulation (activity) from picture is high, e.g., the case where, e.g., picture is moving, etc., there are many instances where sound is masked, so its degradation is not felt.

As described above, the sensitivity of the visual and auditory senses of the human being (masking characteristic) in the case where pictures and sounds respectively independently exist and that in the case where pictures and sounds exist in a manner relative to each other like cinema, etc. are greatly different. Accordingly, there was the possibility that in the case where pictures and sounds exist in a manner relative to each other like cinema, etc., if pictures and sounds are caused to respectively independently undergo compression processing as in the prior art, optimum compression encoding might not be carried out.

This invention has been made in view of actual circumstances as described above, and its object is to provide an encoding apparatus and an encoding method which can carry out more optimum compression encoding in connection with pictures (video signals) and sounds (speech signals).

DISCLOSURE OF THE INVENTION

An encoding apparatus of this invention is directed to an encoding apparatus adapted for respectively compression-encoding a digital video signal and a digital speech signal related thereto, and includes first characteristic detecting means for detecting the characteristic of the digital video signal, second characteristic detecting means for detecting the characteristic of the digital speech signal, synthesizing means for synthesizing outputs of the first and second characteristic detecting means, and control means for controlling allocated information quantities of compression encoding of the digital video signal and the digital speech signal on the basis of an output of the synthesizing means.

Here, the first and second characteristic detecting means respectively detect activities of video signal and speech signal. The activity is detected by detecting changes in point of space and/or time of signal. Further, the synthesizing means respectively multiplies respective outputs of the first and second characteristic detecting means by predetermined coefficients thereafter to synthesize them.

Moreover, in the encoding apparatus of this invention, there is provided a buffer memory for temporarily holding a compression-encoded signal thereafter to output it as an output signal, and the control means controls allocated information quantities of compression encoding of the digital video signal and the digital speech signal in accordance with quantity of information stored in the buffer memory and a synthesis output of the synthesizing means.

Further, the first characteristic detecting means comprises a frame memory for frame-delaying a digital video signal, a line memory for line-delaying the digital video signal, a sample memory for sample-delaying the digital video signal, first difference calculating means for calculating (determining) a difference between the frame-delayed digital video signal from the frame memory and an input digital video signal, second difference calculating means for calculating (determining) a difference between the line-delayed digital video signal from the line memory and the input digital video signal, and third difference calculating means for calculating (determining) a difference between the sample-delayed digital video signal from the sample memory and the input digital video signal. The first characteristic detecting means at this time includes non-linear synthesizing means for non-linearly synthesizing outputs of the first, second and third difference calculating means.

Moreover, the second characteristic detecting means is composed of amplitude information generating means for generating amplitude information of an input digital speech signal, energy detecting means for detecting energy on the basis of an amplitude value from the amplitude information generating means, and convolution operation means for implementing convolution operation to an output of the energy detecting means.

Alternatively, the first characteristic detecting means and the second characteristic detecting means may respectively comprise great change quantity detecting means for detecting great change quantity of signal, first comparing means for comparing an output of the great change quantity detecting means with a predetermined threshold value, very small change quantity detecting means for detecting a very small change of signal, second comparing means for comparing an output of the very small change quantity detecting means with a predetermined threshold value, and judging means for judging from outputs of the first and second comparing means whether or not activity exists.

An encoding method of this invention is directed to an encoding method of respectively compression-encoding a digital video signal and a digital speech signal related thereto to transmit the encoded signals, and comprises the steps of detecting the characteristic of the digital video signal, detecting the characteristic of the digital speech signal, synthesizing a characteristic detection output of the digital video signal and a characteristic detection output of the digital speech signal, and controlling allocated information quantities of compression encoding of the digital video signal and the digital speech signal on the basis of the synthesis output.

Here, in characteristic detections of the digital video signal and the digital speech signal, activities of video signal and speech signal are respectively detected. Also at this time, the activity is detected by detecting changes in point of space and/or time of signal.

Accordingly, in accordance with the encoding apparatus and the encoding method of this invention, allocated information quantity of compression encoding of digital video signal is caused to be information quantity in which the characteristic of speech signal detected by second characteristic detecting means is added, and allocated information quantity of compression encoding of digital speech signal is caused to be information quantity in which the characteristic of video signal detected by the first characteristic detecting means is added.

For this reason, optimum information quantity allocation is determined from the relationship between video signal and speech signal, and efficient compression encoding is carried out on the basis of the optimum information quantity allocation thus determined.

BEST MODE FOR CARRYING OUT THE INVENTION

A preferred embodiment of this invention will now be described with reference to the attached drawings.

Figure 1:
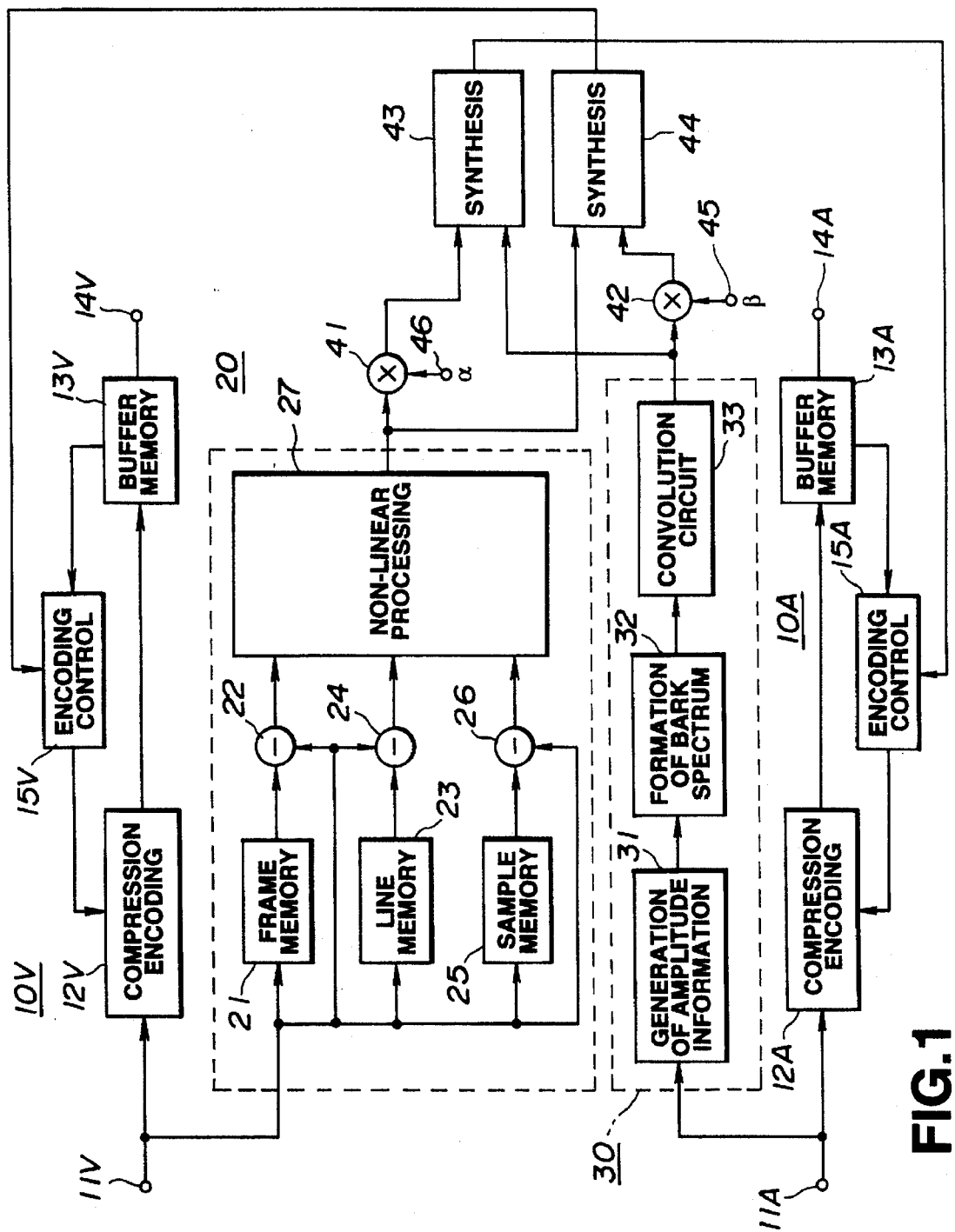
FIG. 1 is a circuit diagram showing, in a block form, outline of the configuration of an encoding apparatus of an embodiment according to this invention.

In FIG. 1, reference numeral 10V denotes a compression encoding processing system for a digital video signal, and reference numeral 10A denotes a compression encoding processing system for a digital speech signal.

In the compression encoding processing system 10V for digital video signal, a digital video signal through input terminal 11V is delivered to compression encoding circuit 12V, at which compression encoding suitable for video signal is carried out. As such compression encoding suitable for video signal, e.g., technique using DCT (Discrete Cosine Transform), technique using so called ADRC (Adaptive Dynamic Range Coding) and the like can be used.

It should be noted that the above-mentioned ADRC is a coding system of determining dynamic range (difference between maximum level and minimum level within block) and minimum level with respect to a plurality of pixels included in a two-dimensional block within one field to equally divide the dynamic range by compressed quantization bit number to encode respective pixels within block so that they are changed to codes of the nearest level as described in the Japanese Patent Application Laid Open No. 144989/1986 and the Japanese Patent Application Laid Open No. 266989/1987. Namely, since a video signal like a television signal, for example, has correlation in horizontal and vertical directions, change width of level of pixel data included within the same block is small at the stationary part. Accordingly, even if dynamic range of data after undergone elimination of minimum level that pixel data within block hold in common is quantized by quantization bit number lesser than the original quantization bit number, quantization distortion hardly takes place. By allowing the quantization bit number to be lesser in this way, transmission bandwidth of data can be narrower than that of the original one.

Figure 2:
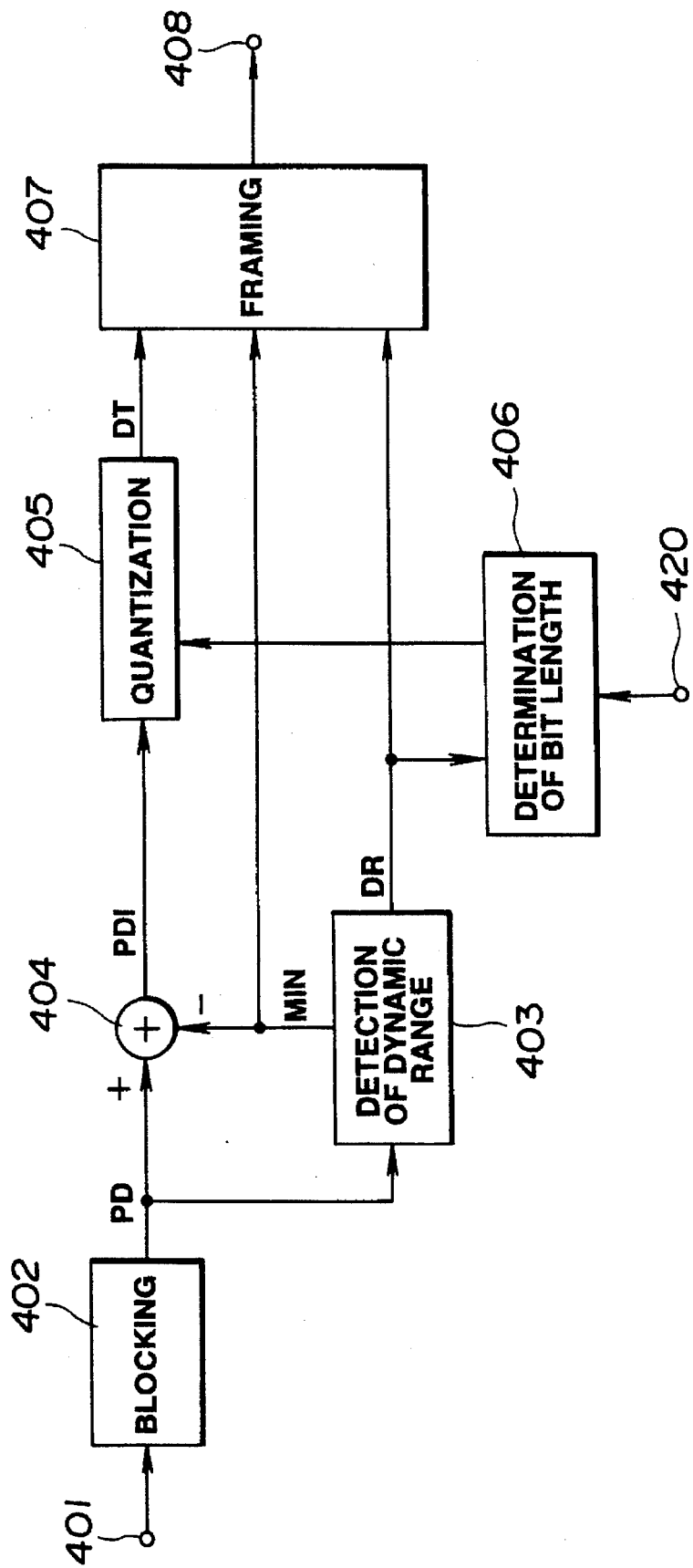
FIG. 2 is a circuit diagram showing, in a block form, the configuration of an actual example of a compression encoding circuit for a video signal.

In this embodiment, the compression encoding circuit 12V for video signal is of a structure to carry out compression encoding by using the ADRC as shown in FIG. 2.

Namely, the compression encoding circuit 12V shown in FIG. 2 serves to divide a digital video signal into blocks to determine dynamic range DR prescribed by maximum value MAX and minimum value MIN of a plurality of pixel data included within corresponding block to encode (re-quantize) respective pixel data within the corresponding block by allocated bit number adaptive to the dynamic range determined every block.

In FIG. 2, input terminal 401 is supplied with digital video signal (e.g., digital television signal) in which, e.g., one sample is quantized into 8 bits. This digital video signal is delivered to blocking circuit 402.

The blocking circuit 402 changes the input digital video signal into signals continuous every two-dimensional blocks which are unit of encoding. In this embodiment, one block is caused to have dimensions of 8 lines×8 pixels=64 pixels. An output signal of the blocking circuit 402 is delivered to dynamic range detecting circuit 403 and adding circuit 404 operative as a subtracting circuit. The dynamic range detecting circuit 403 detects dynamic range DR, minimum value MIN and maximum value MAX every block, and outputs of values of the dynamic range DR and the minimum value DIN (or the maximum value MAX).

The minimum value MIN is sent to the adding circuit 404 as a subtraction signal. Moreover, this adding circuit 404 is supplied with pixel data PD from the blocking circuit 402 as an addition signal. Accordingly, at this adding circuit 404, pixel data PDI in which the minimum value MIN is eliminated is formed.

Moreover, dynamic range DR detected at the dynamic range detecting circuit 403 is sent to bit length determining circuit 406. This bit length determining circuit 406 determines allocated bit number (allocated bit number in quantization) every compression encoding unit such as block mentioned above, etc. on the basis of control signal from encoding control circuit 15V, which will be described later, delivered through terminal 420 and the dynamic range DR.

The allocated bit number determined by the bit length determining circuit 406 is delivered to quantizing circuit 405. This quantizing circuit 405 is supplied with pixel data PDI after undergone elimination of minimum value from the adding circuit 404. At the quantizing circuit 405, quantization of pixel data PDI is carried out by the above-described allocated bit number.

In this case, the bit length determining circuit 406 may be adapted to determine an allocated bit number such that maximum distortion can be changed by non-linear characteristic matching with the visual sense characteristic of the human being without employment of a linearly allocated bit number such that the maximum distortion is fixed with respect to the dynamic range at the time of determining allocated bit number. Namely, generally, in the case where there is a change of e.g., sharp luminance level within block (when dynamic range is large), small change of luminance level is difficult to be conspicuous. Accordingly, e.g., in a block where dynamic range is large, allocated bit number is reduced. As stated above, at bit length determining circuit 406, allocated bit number adaptive to the dynamic range is determined. Thus, when the dynamic range is large, even if the maximum distortion is large, no block distortion takes place. Accordingly, the compression efficiency is permitted to be high.

Encoding code DT from the quantizing circuit 405 is sent to framing circuit 407. This framing circuit 407 is also supplied with dynamic range DR (e.g., 8 bits) and minimum value MIN (e.g., 8 bits) as addition codes every block. Moreover, this framing circuit 407 implements error correction encoding processing to encoding code DT and the above-described addition codes, and adds synchronizing signal thereto.

An output of this framing circuit 407 is sent to buffer memory 13V through terminal 408 as compression-encoded digital video signal, and is outputted from output terminal 14V through the buffer memory 13V.

On the other hand, in the compression encoding processing system 10A for digital speech signal, digital speech signal through input terminal 11A is delivered to compression encoding circuit 12A, at which there is carried out as described later processing for compression-encoding speech signal in which the hearing sense characteristic of the human being is taken into consideration.

It is to be noted that the compression encoding processing in which the hearing sense characteristic of the human being is taken into consideration is such a processing as described in the U.S. Pat. No. 5,151,941, i.e., a processing to divide an input digital signal of an audio signal into signals in a plurality of frequency bands, and to make a selection such that the bandwidth become broader according as frequency shifts to a higher frequency band side to set allowed noise levels of respective band units on the basis of energies every respective bands to re-quantize components of respective bands by bit numbers corresponding to levels of differences between energies of respective bands and set allowed noise levels.

Figure 3:
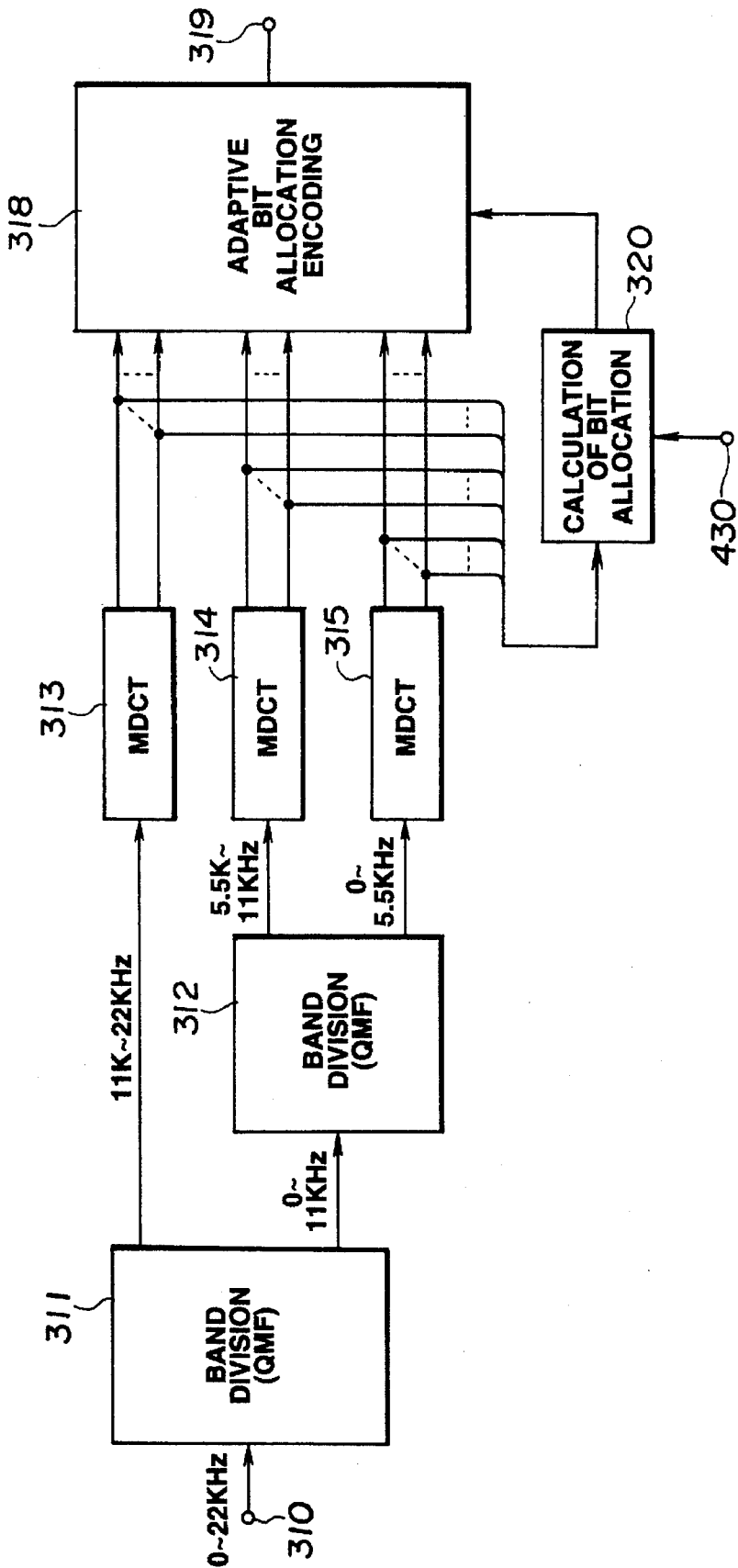
FIG. 3 is a circuit diagram showing, in a block form, the configuration of an actual example of a compression encoding circuit for a speech signal.

In this embodiment, the above-mentioned compression encoding circuit 12A for speech signal has a configuration as shown in FIG. 3.

In FIG. 3, input terminal 310 is supplied with audio PCM signal of 0–22 kHz when sampling frequency is, e.g., 44.1 kHz. This input signal is divided into a signal in 0–11 kHz band and a signal in 11 k–22 kHz band by band division filter 311 comprised of, e.g., so called QMF (Quadrature Mirror Filter), etc. The signal in the 0–11 kHz band is divided into a signal in 0–5.5 kHz band and a signal in 5.5 k–11 kHz band by band division filter 312 similarly comprised of filter such as QMF, etc. The signal in the 11–22 kHz band from band division filter 311 is sent to MDCT circuit 313 which is an example of orthogonal transform circuit, the signal in the 5.5 k–11 kHz band from band division filter 312 is sent to MDCT circuit 314, and the signal in the 0–5.5 kHz band from band division filter 312 is sent to MDCT circuit 315. Thus, those signals are caused to undergo MDCT processing.

As the above-described technique for dividing an input digital signal into signals in a plurality of frequency bands, there is, e.g., band division technique by filter such as the QMF mentioned above, etc. This band division technique is described in "Digital coding of speech in subbands" R. E. Crochiere, Bell Syst. Tech. J., Vol. 55, No. 8 1976.

Moreover, band division technique by filter of equal bandwidth is described in the literature "Polyphase Quadrature filters—A new subband coding technique", Joseph H. Rothweiler ICASSP 83, BOSTON.

Further, as the above-described orthogonal transform processing, there is, e.g., such an orthogonal transform processing to divide an input audio signal into blocks every predetermined unit time to carry out, every respective blocks, Fast Fourier Transform (FFT), Discrete Cosine Transform (DCT), or Modified Discrete Cosine Transform (MDCT), etc., to thereby transform signals on the time base into signals on the frequency base. The above-mentioned MDCT is described in "Subband/Transform Coding Using Filter Bank Designs Based on Time Domain Aliasing Cancellation," J. P. Princen A. B. Bradley, Univ. of Surrey Royal Melbourne Inst. of Tech. ICASSP 1987.

Spectrum data or MDCT coefficient data on the frequency base obtained after undergone MDCT processing at the respective MDCT circuits 313, 314, 315 are combined every so called critical bands, and such combined data are sent to adaptive bit allocation encoding circuit 318.

Figure 4:
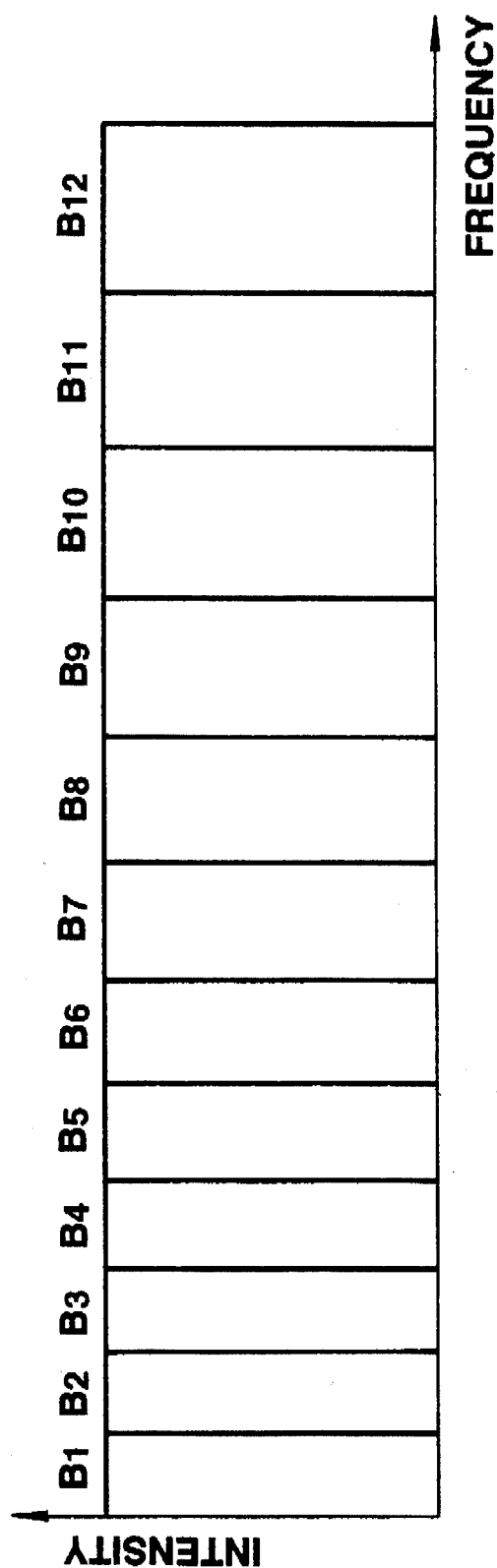
FIG. 4 is a view for explaining critical bands.

It should be noted that the critical bands are frequency bands divided in consideration of the hearing sense characteristic (frequency analysis ability) of the human being, and refer to bands that narrow band noises have when a pure sound is masked by such noises having the same intensity in the vicinity of frequency of that pure sound. The critical bands are such that the bandwidth become broader according as frequency shifts to a higher frequency band side, and the entire frequency band of 0–22 kHz is divided into, e.g., 25 critical bands. Namely, while the number of bands is represented by 12 ($B_1$–$B_{12}$) for brevity of illustration in FIG. 4, for example, the critical bands are such that the bandwidth become broader according as frequency shifts to a higher frequency band side. Moreover, the hearing sense of the human being has a characteristic such as a sort of band-pass filter, and bands separated by respective filters are called critical bands.

Bit allocation calculating circuit 320 determines allocated bit numbers every compression encoding units such as blocks or frames, etc. on the basis of control signal from encoding control circuit 15A, which will be described later, delivered through terminal 430, and determines allocated bit numbers every respective bands in consideration of so called masking effect based on spectrum data divided by taking the critical bands into consideration.

This information is sent to adaptive bit allocation encoding circuit 318. This adaptive bit allocation encoding circuit 318 re-quantizes respective spectrum data (or MDCT coefficient data) in dependency upon bit numbers allocated every respective bands. Data encoded in this way is sent to buffer memory 13A through output terminal 319, and is outputted from output terminal 14A through the buffer memory 13A.

Figure 5:
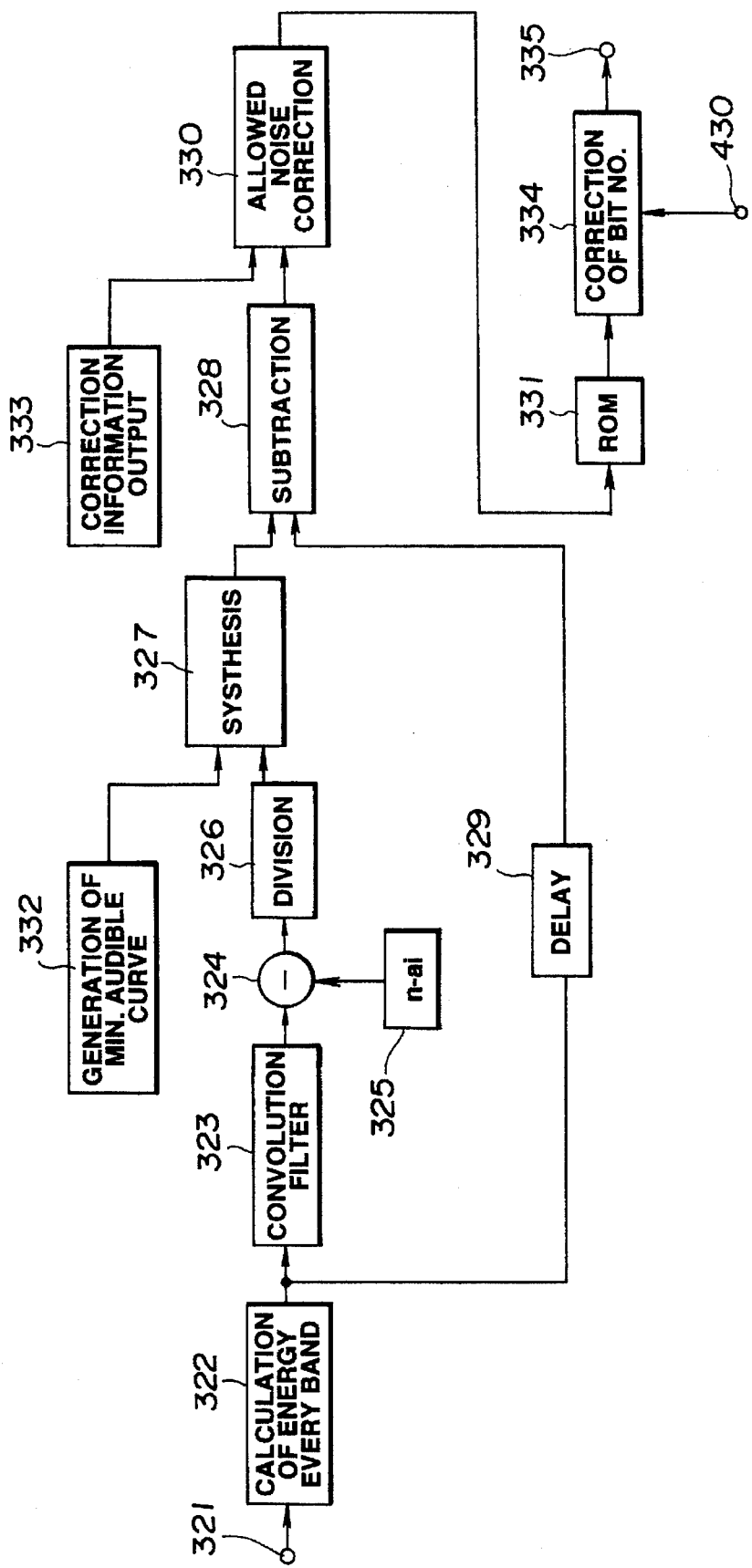
FIG. 5 is a circuit diagram showing, in a block form, the configuration of an actual example of a bit allocation calculating circuit of a speech signal compression-encoding circuit.

Outline of the configuration of an actual example of the bit allocation calculating circuit 320 is shown in FIG. 5.

In FIG. 5, input terminal 321 is supplied with spectrum data on the frequency base from the respective MDCT circuits 313, 314, 315.

Then, the input data on the frequency base is sent to energy calculating circuit 322 every bands. Thus, energies of respective divided bands in which the critical bands are taken into consideration are determined by a method of calculating, e.g., sum totals of respective amplitude values within corresponding bands, or using similar method. In place of energies every respective bands, peak values or mean values of amplitude values, etc. may be used. As an output from this energy calculating circuit 322, e.g., respective values of bark spectrum which are sum total values of respective bands are indicated as SB in FIG. 6. It should be noted that the number of divided bands is 12 ($B_1$–$B_{12}$) for brevity of illustration in FIG. 6.

Here, in order to allow for the influence in so called masking of the bark spectrum SB, such a convolution processing is implemented to the bark spectrum SB to multiply respective values thereof by a predetermined weighting function to add them. To realize this, outputs of the energy calculating circuit 322 every respective bands, i.e., respective values of the bark spectrum SB are sent to convolution filter circuit 323.

Figure 7:
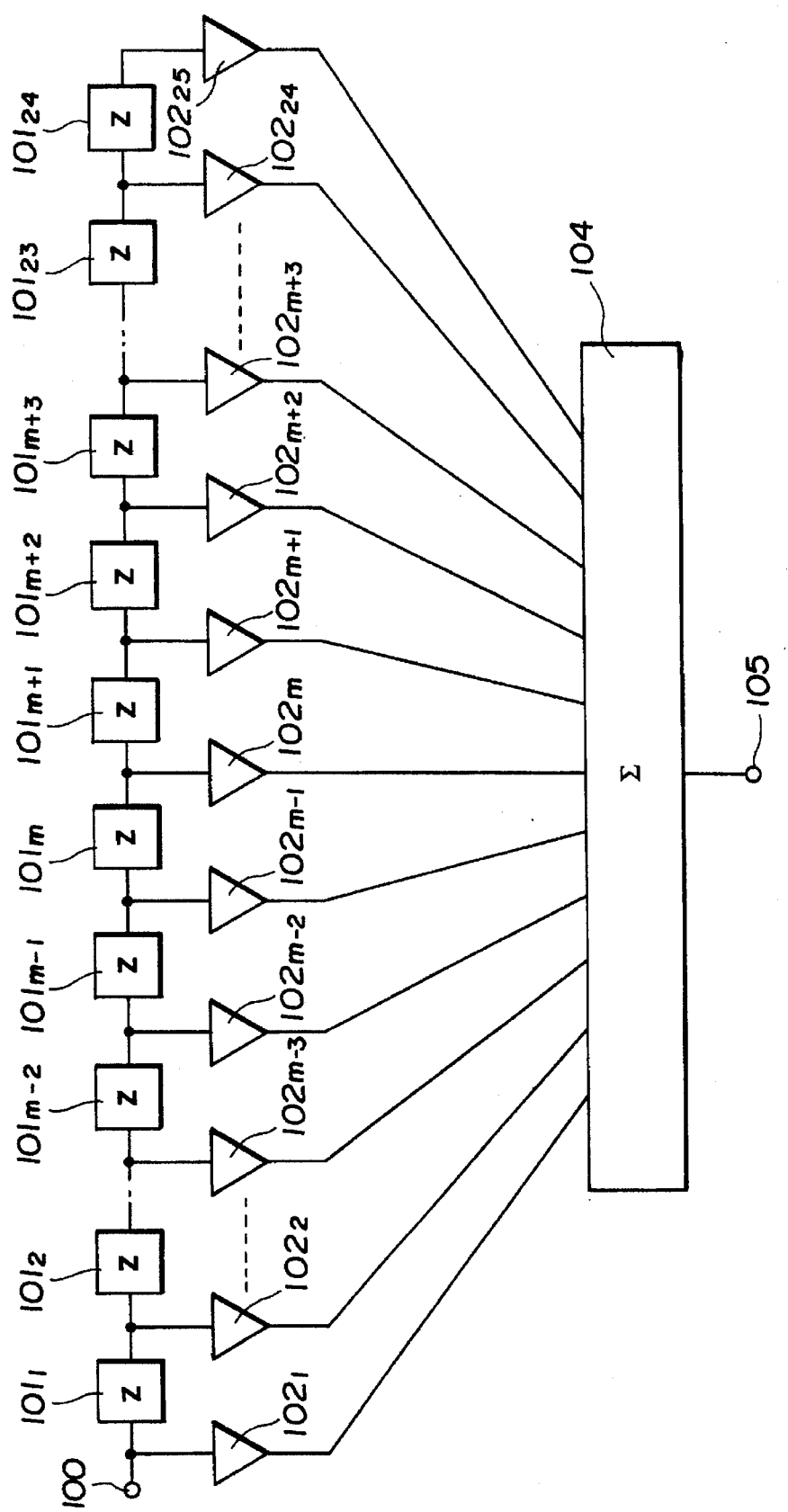
FIG. 7 is a circuit diagram showing, in a block form, the configuration of FIR filter.

This convolution filter circuit 323 may be constituted with FIR filter as shown in FIG. 7, for example. Namely, this convolution filter circuit 323 is composed, as shown in FIG. 7, of delay elements ($z^{-1}$) $101_1$, $102_2$ ... $101_{m-2}$–$101_{m+3}$ .. $101_{23}$, $101_{24}$ for sequentially delaying input data from input terminal 100, e.g. 25 multipliers $102_1$, $102_2$ ... $102_{m-3}$–$102_{m+3}$ ... $102_{24}$, $102_{25}$ for multiplying outputs from these delay elements $101_1$–$101_{24}$ by filter coefficients (weighting function), and sum total adder 104.

Figure 6:
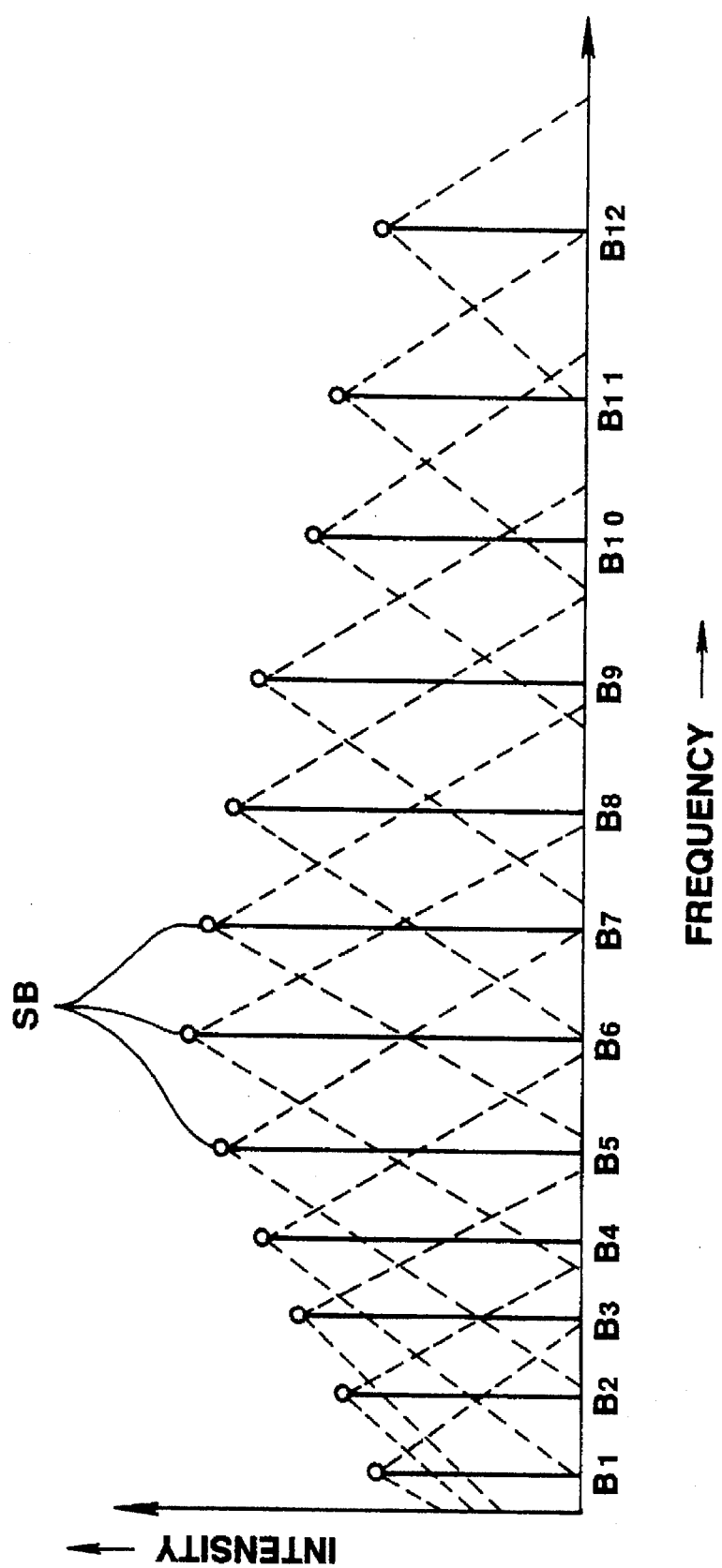
FIG. 6 is a view for explaining bark spectrum.

Here, in respective multipliers $102_{m-3}$–$102_{m+3}$ of the convolution filter circuit 323, when, e.g., coefficient of multiplier M corresponding to an arbitrary band is assumed to be 1, outputs of delay elements are respectively multiplied by filter coefficient 0.0000086 at multiplier $102_{m-3}$, filter coefficient 0.0019 at multiplier $102_{m-2}$, filter coefficient 0.15 at multiplier $102_{m-1}$, filter coefficient 1 at multiplier $102_m$, filter coefficient 0.4 at multiplier $102_{m+1}$, filter coefficient 0.06 at multiplier $102_{m+2}$, and filter coefficient 0.007 at multiplier $102_{m+3}$. Thus, convolution processing of bark spectrum SB is carried out. By this convolution processing, sum totals of the portions indicated by dotted lines in FIG. 6 are taken.

It should be noted that masking of speech referred to here is the phenomenon that a signal is masked by another signal so that it cannot be heard. As such masking effect, there are time base masking effect by signal of sound on the time base and simultaneous masking effect by signal on the frequency base. By these masking effects, even if any noise exists at the portion caused to undergo masking, such noise could not be heard. For this reason, in the case of signal of actual sound, noise within the range caused to undergo masking is considered to be allowable noise.

Output of the convolution filter circuit 323 is sent to subtracter 324. This subtracter 324 serves to determine (calculate) level γ corresponding to allowable noise level which will be described later in the convoluted region. It is here noted that the level γ corresponding to the allowable noise level (allowed noise level) is such a level to become equal to allowed noise levels every respective bands of critical bands by carrying out inverse convolution processing as described later. The subtracter 324 is supplied with allowed function (function representing masking level) for determining the level γ. By increasing or decreasing this allowed function value, control of the level γ is carried out. This allowed function is delivered from (n-ai) function generating circuit 325 as described below.

Namely, when numbers given in order from lower frequency band of the critical band are assumed to be i, level γ corresponding to allowed noise level can be determined (calculated) by the following formula (1).

$$\gamma = S - (n-ai) \tag{1}$$

In the formula (1), n and a(>0) are constant, S is intensity of convoluted bark spectrum, and (n-ai) in the formula (1) is allowed function. In this embodiment, setting is made such that n=38 and a=1. There is no degradation of sound quality at this time. Thus, satisfactory encoding is carried out.

In this way, the above-mentioned γ is determined. This data is sent to divider 326. This divider 326 serves to implement inverse convolution to the level γ in the convoluted region. Accordingly, by carrying out this inverse convolution processing, masking spectrum can be obtained from the level γ. Namely, this masking spectrum becomes allowed noise spectrum. It is to be noted while the inverse convolution processing requires complicated operation, simplified divider 326 is used in the embodiment to carry out inverse convolution.

Figure 8:
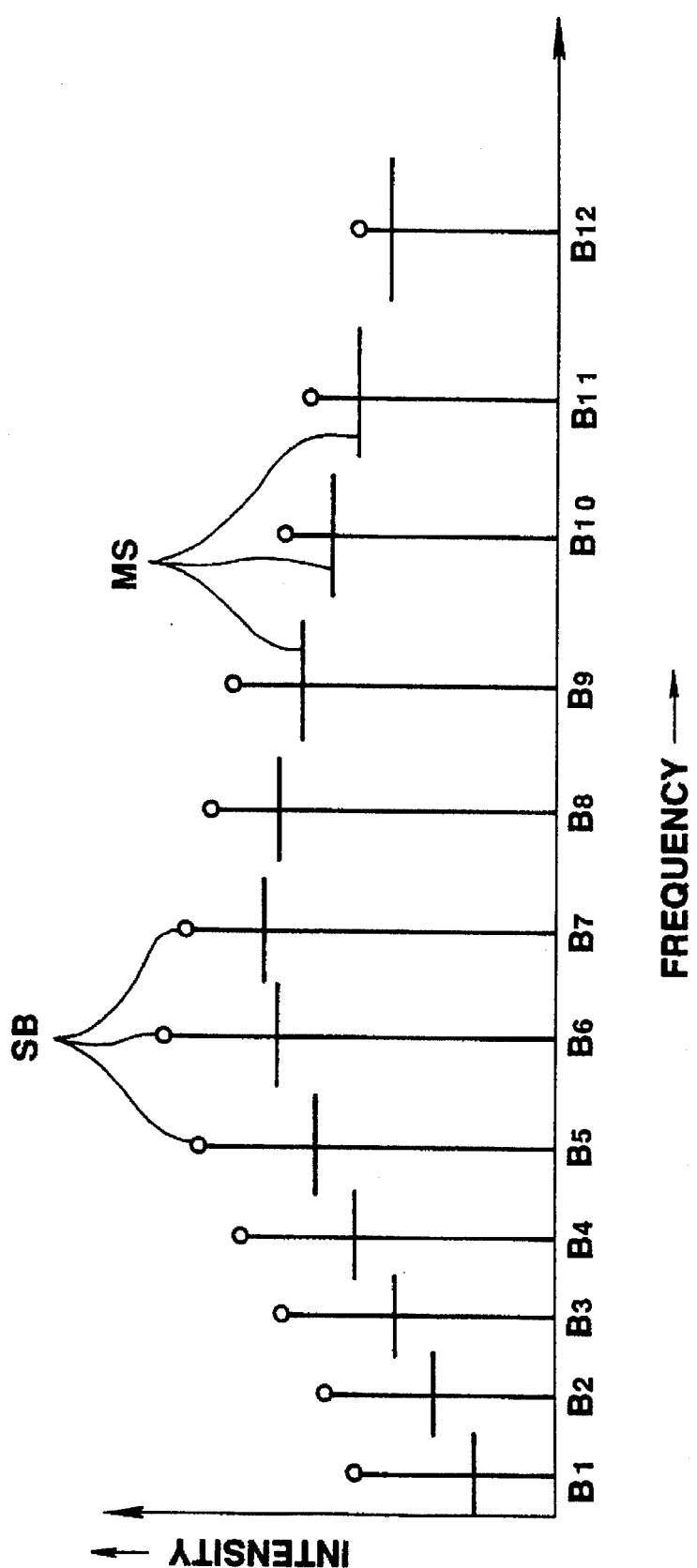
FIG. 8 is a view for explaining bark spectrum and masking spectrum.

The masking spectrum is sent to subtracter 328 through synthesis circuit 327. This subtracter 328 is supplied with output from energy detecting circuit 322 every band, i.e., the previously described spectrum SB through delay circuit 329. Accordingly, at this subtracter 328, subtractive operation between the masking spectrum and the spectrum SB is carried out. Thus, with respect to the spectrum SB, the portions below level indicated by levels of the masking spectrum values MS are masked as shown in FIG. 8.

Output from the subtracter 328 is sent, through allowed noise correcting circuit 330, to ROM 331 in which, e.g., allocated bit number information is stored in advance. This ROM 331 outputs allocated bit number information every respective bands in accordance with outputs obtained through allowed noise correcting circuit 330 from the subtracting circuit 328 (levels of differences between energies of the respective bands and output of noise level setting means (not shown)).

This allocated bit number information is further sent to bit number correcting circuit 334. This bit number correcting circuit 334 corrects bit number information outputted from the ROM 331 on the basis of control signal from encoding control circuit 15A, which will be described later, delivered through the terminal 430.

Bit number information from the bit number correcting circuit 334 is sent to the adaptive bit allocation encoding circuit 318 through terminal 335. Thus, at this adaptive bit allocation encoding circuit 318, respective spectrum data on the frequency base from MDCT circuits 313, 314, 315 are quantized by bit numbers allocated every respective bands.

Delay circuit 329 is provided for delaying spectrum SB from energy detecting circuit 322 by taking into consideration delay quantities at respective circuits preceding to the synthesis circuit 327.

Figure 9:
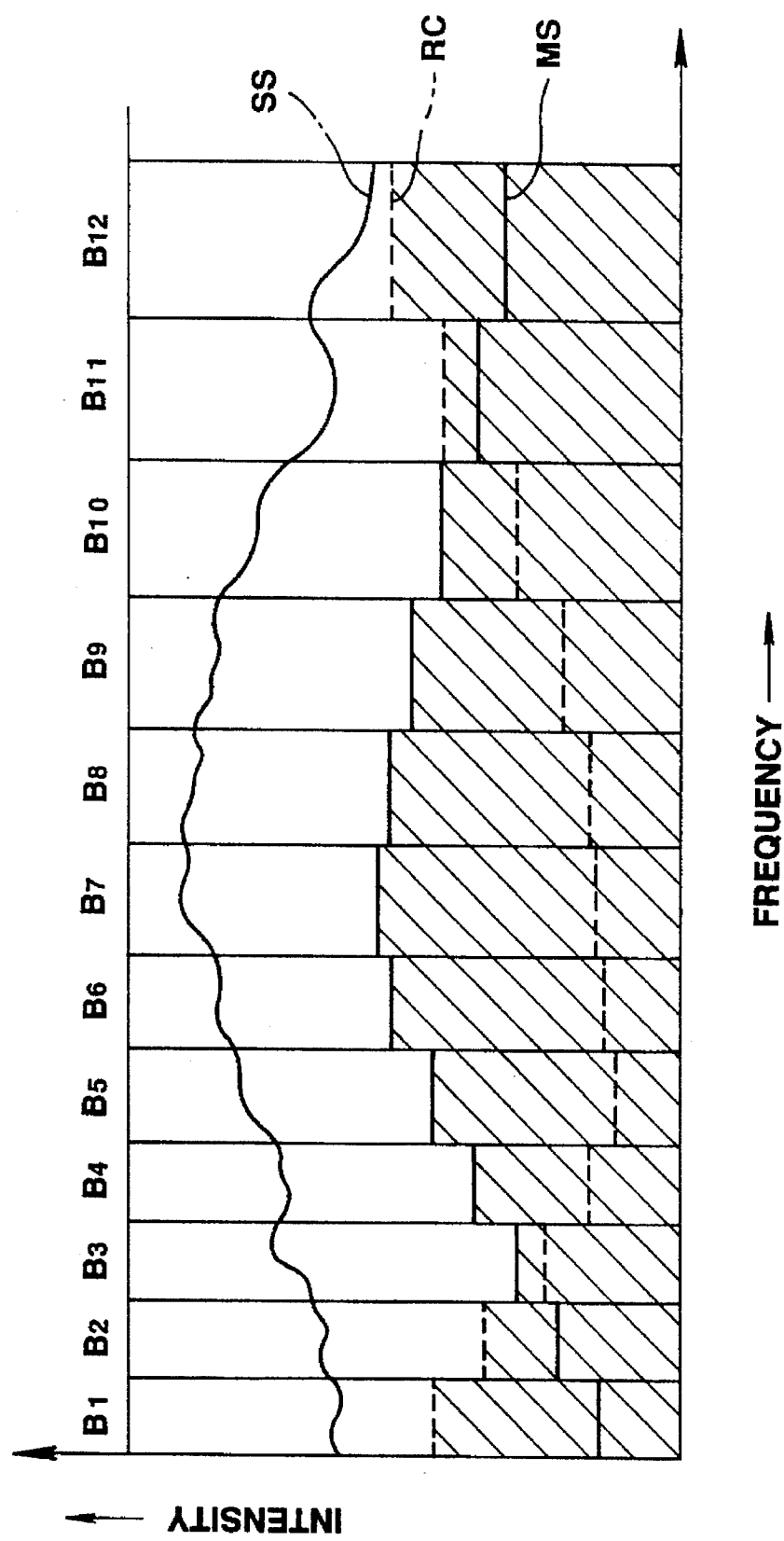
FIG. 9 is a view in which minimum audible curve and masking spectrum are synthesized.

Moreover, in synthesis at the above-described synthesis circuit 327, it is possible to synthesize data indicating so called minimum audible curve RC which is the hearing sense characteristic of the human being as shown in FIG. 9 delivered from minimum audible curve generating circuit 332 and the masking spectrum MS. In this minimum audible curve, if absolute noise level is less than this minimum audible curve, such noise cannot be heard. This minimum audible curve changes, e.g., in dependency upon difference of reproduction volume at the time of reproduction even if coding is the same. However, in realistic digital system, it is considered that since there is not so difference in way of entering of music into, e.g., 16 bit dynamic range, if quantizing noise in frequency band exceedingly easy to be heard, e.g., in the vicinity with 4 kHz to the ear cannot be heard, quantizing noise less than level of the minimum audible limit curve cannot be heard in other frequency bands.

Accordingly, when, e.g., a way of use such that noise in the vicinity of 4 kHz of word length that system has is not heard is assumed to be adopted and the minimum audible curve RC and the masking spectrum MS are synthesized to provide allowed noise level, allowed noise level in this case can be as far as the portion indicated by slanting lines in FIG. 9. In this embodiment, level of 4 kHz of the minimum audible curve is in correspondence with the minimum level corresponding to, e.g., 20 bits. In FIG. 9, signal spectrum is indicated together.

Moreover, the allowed noise correcting circuit 330 corrects allowed noise level in output from the subtracter 328 on the basis of, e.g., information of equi-loudness curve sent from correction information output circuit 333. Here, equi-loudness curve is characteristic curve relating to the hearing sense characteristic of the human being. This equi-loudness curve is obtained by determining sound pressures of sound at respective frequencies which can be heard at the same pitch as pure sound of, e.g., 1 kHz to connect them by curves, and is also called equi-sensitivity curve of loudness. Moreover, this equi-loudness curve depicts substantially the same curve as the minimum audible curve RC shown in FIG. 9. In this equi-loudness curve, e.g., in the vicinity of 4 kHz, even if sound pressure is lowered by 8–10 dB as compared to that at 1 kHz, sound can be heard at the same loudness (pitch) as that at 1 kHz. In contrast, in the vicinity of 50 kHz, if sound pressure is not higher than sound pressure at 1 kHz by about 15 dB, such sound cannot be heard as sound of the same loudness (pitch). For this reason, it is seen that noise above level of the minimum audible curve is caused to have frequency characteristic given by curve corresponding to the equi-loudness curve. From facts described above, it is seen that employment of the method of correcting the allowed noise level by taking the equi-loudness curve into consideration is in conformity with the hearing sense characteristic of the human being.

Meanwhile, in the encoding apparatus of this embodiment, in determination of allocated bit number in the above-described compression-encoding of video signal and speech signal, a method as described below is carried out, thereby permitting optimum compression encoding with respect to picture and sound.

Namely, in the encoding apparatus of the embodiment according to this invention, encoding control circuit 15V determines allocated bit numbers in encoding processing at compression encoding circuit 12V so as to add not only characteristic of digital video signal but also characteristic of digital speech signal at that time. Further, in this determination of allocation bit numbers, consideration is also taken such that transmission rate of digital video signal outputted from buffer memory 13V becomes equal to a target value determined in advance.

Figure 10:
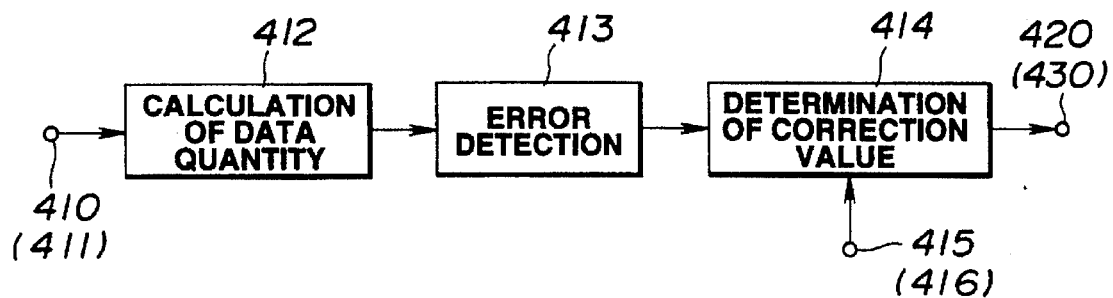
FIG. 10 is a circuit diagram showing, in a block form, the configuration of an actual example of an encoding control circuit.

Initially, in order to allow for the transmission rate of the digital video signal, output of buffer memory 13V is delivered to terminal 410 of encoding control circuit 15V constructed as shown in FIG. 10.

At this encoding control circuit 15 V, quantity of data outputted from the buffer memory 13V is calculated by data quantity calculating circuit 412. Thus, transmission rate based thereon is determined. At error detecting circuit 413, whether or not that transmission rate is target value (transmission rate of transmission path connected succeedingly to terminal 14) is judged. If the data quantity is not equal to the target value, optimum allocated bit number at compression encoding circuit 12V is determined, at correction value determining circuit 414 of the succeeding stage, on the basis of that error quantity and both characteristics of digital video signal and digital speech signal (the relationship therebetween), which will be described later, delivered through terminal 415. Signal from the correction value determining circuit 414 is sent to compression encoding circuit 12V as the control signal through terminal 420.

The configuration is similar to the above also with respect to digital speech signal. Encoding control circuit 15A has a configuration similar to that of FIG. 10, and serves to calculate data quantity from buffer memory 13A, which has been delivered to terminal 411 of the encoding control circuit 15A, to determine that transmission rate to determine optimum allocated bit number in encoding processing at compression encoding circuit 12A on the basis of error quantity between that transmission rate and target value and the characteristic in which both characteristics of digital speech signal and digital video signal (relationship therebetween) delivered through terminal 416 are taken into consideration. Signal from correction value determining circuit 414 of the encoding control circuit 15A is sent to compression encoding circuit 12A as the control signal through terminal 430.

In this embodiment, the characteristics of digital video signal and the digital speech signal are detected by determining respective activities.

Turning back to FIG. 1, reference numeral 20 denotes a circuit for determining activity of video signal as first characteristic detecting means, and reference numeral 30 denotes a circuit for determining activity of speech signal as second characteristic detecting means.

Video signal activity detecting circuit 20 for determining activity of video signal detects changes in point of space and time of video signal. Namely, digital video signal supplied to input terminal 11V is delivered to subtracting circuit 22. Further, such digital video signal is delayed by one frame by frame memory 21, and is then delivered to operation circuit 22. Thus, change between two frames is obtained from this subtracting circuit 22, and change in point of time thereof is delivered to non-linear circuit 27.

Moreover, digital video signal delivered to input terminal 11V is delivered to subtracting circuit 24. Further, such digital video signal is delayed by one line by line memory 23, and is then delivered to subtracting circuit 24. Thus, change between two lines is obtained from subtracting circuit 24, and change in point of space thereof is delivered to the non-linear circuit 27.

Further, digital video signal delivered to input terminal 11V is delivered to subtracting circuit 26. Such digital video signal is delayed by one pixel by sample memory 25, and is then delivered to subtracting circuit 26. Thus, change between 2 pixels is obtained from subtracting circuit 24, and change in point of space thereof is delivered to non-linear circuit 27.

The non-linear circuit 27 has a ROM table for holding non-linear coefficients determined in advance in accordance with, e.g., experience rule, and serves to add weights to change in point of space and change in point of time from subtracting circuits 22, 24, 26 by using these non-linear coefficients to synthesize them. Its synthesis output is obtained from the activity detecting circuit 20 as detection output of activity of video signal.

Detection output of activity of video signal from the activity detecting circuit 20 is delivered to synthesis circuit 44 as the synthesizing means, and is multiplied by predetermined weighting coefficient $\alpha$ from terminal 46 by weighting circuit 41, and is delivered to synthesis circuit 43 similarly serving as synthesizing means.

On the other hand, speech signal activity detecting circuit 30 for determining activity of speech signal as second characteristic detecting means is constructed so as to allow for the hearing sense characteristic of the human being. This circuit also serves to determine changes in point of space and time of speech signal. It should be noted that, in the activity detecting circuit 30, activity of speech signal is detected by making use of the fact that the hearing sense of the human being is sensitive to amplitude in the frequency region, but is considerably dull with respect to phase.

Figure 11:
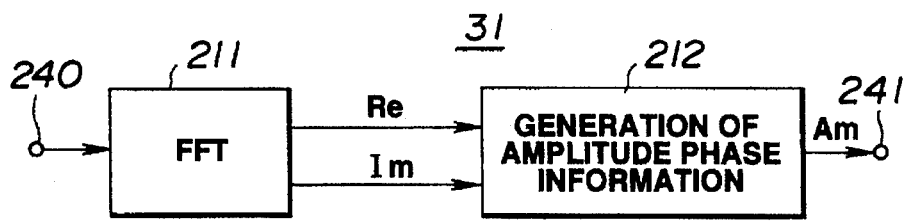
FIG. 11 is a circuit diagram showing, in a block form, the configuration of an actual example of an amplitude information generating circuit.

Namely, at the speech signal activity detecting circuit 30, digital speech signal caused to be through input terminal 11A is delivered to amplitude information generating circuit 31. This amplitude information generating circuit 31 is composed, as shown in FIG. 11, of Fast Fourier Transform circuit 211 for implementing Fast Fourier Transform (FFT) processing to digital speech signal delivered terminal 240, and amplitude phase information generating circuit 212 for forming amplitude value information Am of digital speech signal from real number component value Re and imaginary number component value Im of FFT coefficients obtained as the result of Fast Fourier Transform processing at the Fast Fourier Transform circuit 211.

Figure 12:
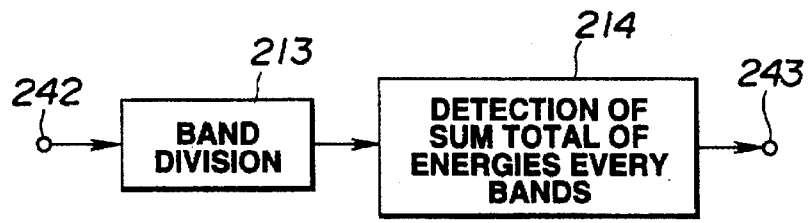
FIG. 12 is a circuit diagram showing, in a block form, the configuration of an actual example of a bark spectrum forming circuit.

Amplitude value information Am outputted from terminal 241 of the amplitude information generating circuit 31 is delivered to bark spectrum forming circuit 32 as the energy detecting means. This bark spectrum forming circuit 32 is constructed as shown in FIG. 12, and first divides the amplitude value information Am into the critical bands by band division circuit 213.

At circuit 214 for detecting sum total of energies every bands succeeding to the band division circuit 213, energies every respective bands (respective spectrum intensities at respective bands) divided by the band division circuit 213 are determined by calculating sum totals of amplitude values Am within respective bands (sum totals of peak values or mean values of amplitude values Am, or energies).

Output of the bark spectrum forming circuit 32 is delivered to convolution circuit 83 through terminal 243. At this convolution circuit 33, in order to allow for the influence in so called masking of the bark spectrum SB (masking of speech), a predetermined weighting function is convoluted into the bark spectrum SB.

This convolution circuit 33 may be constituted with FIR filter similar to that of FIG. 7, for example.

Then, output of the convolution circuit 33 is obtained from the speech signal activity detecting circuit 30 as detection output of activity of speech signal. The detection output of activity of speech signal from the detecting circuit 30 is delivered to synthesis circuit 43 as the synthesizing means, and is delivered to the synthesis circuit 44 through weighting circuit 42 for carrying out weighting to perform multiplication of predetermined weighting coefficient $\beta$ delivered from terminal 45.

Then, output of the synthesis circuit 43 is delivered to encoding control circuit 15V, and output of the synthesis circuit 44 is delivered to encoding control circuit 15A.

Compression encoding circuits 12V and 12A are operative to receive control signals from the encoding control circuits 15V and 15A so that allocated bit numbers in compression-encoding digital video signal and digital speech signal are controlled. Namely, at compression encoding circuits 12V and 12A, characteristics of both signals of digital video signal and digital speech signal, activities of the both signals in this example, are synthetically judged. Thus, optimum compression encoding processing respectively optimum to the digital video signal and the digital speech signal are carried out.

The compression encoding circuits 12V and 12A are also operative to receive control signals from encoding control circuits 15A and 15A as previously described to control allocated bit numbers so as to make an adjustment such that transmission rates of video signal data and speech signal data from buffer memories 13V and 13A become equal to respective target values.

In the encoding apparatus of this embodiment according to this invention, allocated bit numbers in compression encoding are optimized on the basis of data quantities of buffer memories 13V and 13A and characteristics of the both signals of digital video signal and digital speech signal as described above. Thus, optimization of transmit information quantity as shown in FIG. 13 can be made.

Figure 13:
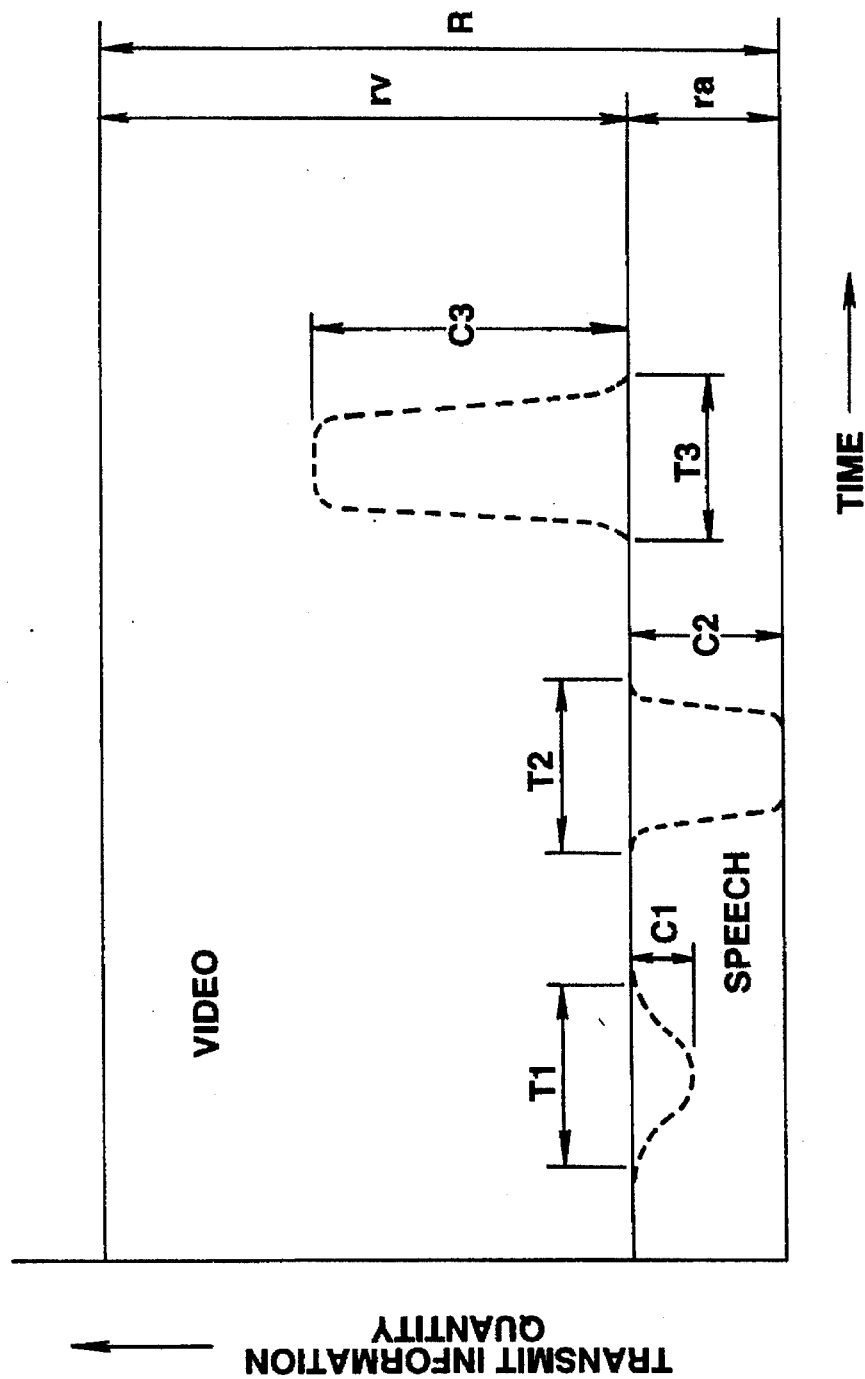
FIG. 13 is a view for explaining transmission rate of a video signal and transmission rate of a speech signal in which transmission rate of transmission path and activity and masking are taken into consideration.

Namely, transmission rate (transmit information quantity) at the transmission path succeeding to output terminals 14V and 14A of FIG. 1 is caused to be ordinarily fixed transmission rate as indicated by R in FIG. 13. In more detail, the transmission rate is caused to be represented by rv in FIG. 13 with respect to the video signal, and the transmission rate is caused to be represented by ra in FIG. 13 with respect to the speech signal. On the contrary, in accordance with the encoding apparatus of the embodiment according to this invention, there is employed a scheme to vary ratio between transmission rate rv of video signal and transmission rate ra of speech signal within a fixed transmission rate indicated by R in the figure by taking detected result of the activity and masking into consideration.

For example, at time period T1 or T2 where activity of video signal is great, transmit information quantity with respect to the video signal necessarily increases. However, since this video signal itself is masked, compression efficiency of video signal is caused to be high, thus making it possible to reduce transmit information quantity. In addition, since attention of the human being is directed to picture image, transmit information quantity can be reduced as indicated by C1 or C2 in the figure with respect to speech signal. In contrast, at time period T3 where activity of speech signal is great, transmit information quantity with respect to the speech signal increases. However, compression efficiency of speech signal is caused to be high by the masking effect of the speech signal itself, thus making it possible to reduce transmit information quantity. In addition, since attention of the human being at this time is directed to sound, transmit information quantity can be reduced as indicated by C3 in the figure with respect to video signal. As a result, the entire transmission rate can be fixed as indicated by R in FIG. 13. Moreover, at time period where great information quantity is required in the video signal, even if greater information quantity is allocated to the video signal, and information quantity with respect to speech signal is reduced, degradation of speech signal is permitted not to become conspicuous. In addition, at time period where great information quantity is required in the speech signal, even if greater information quantity is allocated to the speech signal, and information quantity with respect to video signal is reduced, degradation of video signal is permitted not to become conspicuous. Accordingly, when attention is drawn to picture image from a viewpoint of the visual and auditory senses of the human being, picture quality of image can be improved and the human being is permitted not to feel degradation of sound (speech signal). In contrast, when attention is drawn to sound, sound quality can be improved and the human being is permitted not to feel degradation of picture image.

Figure 14:
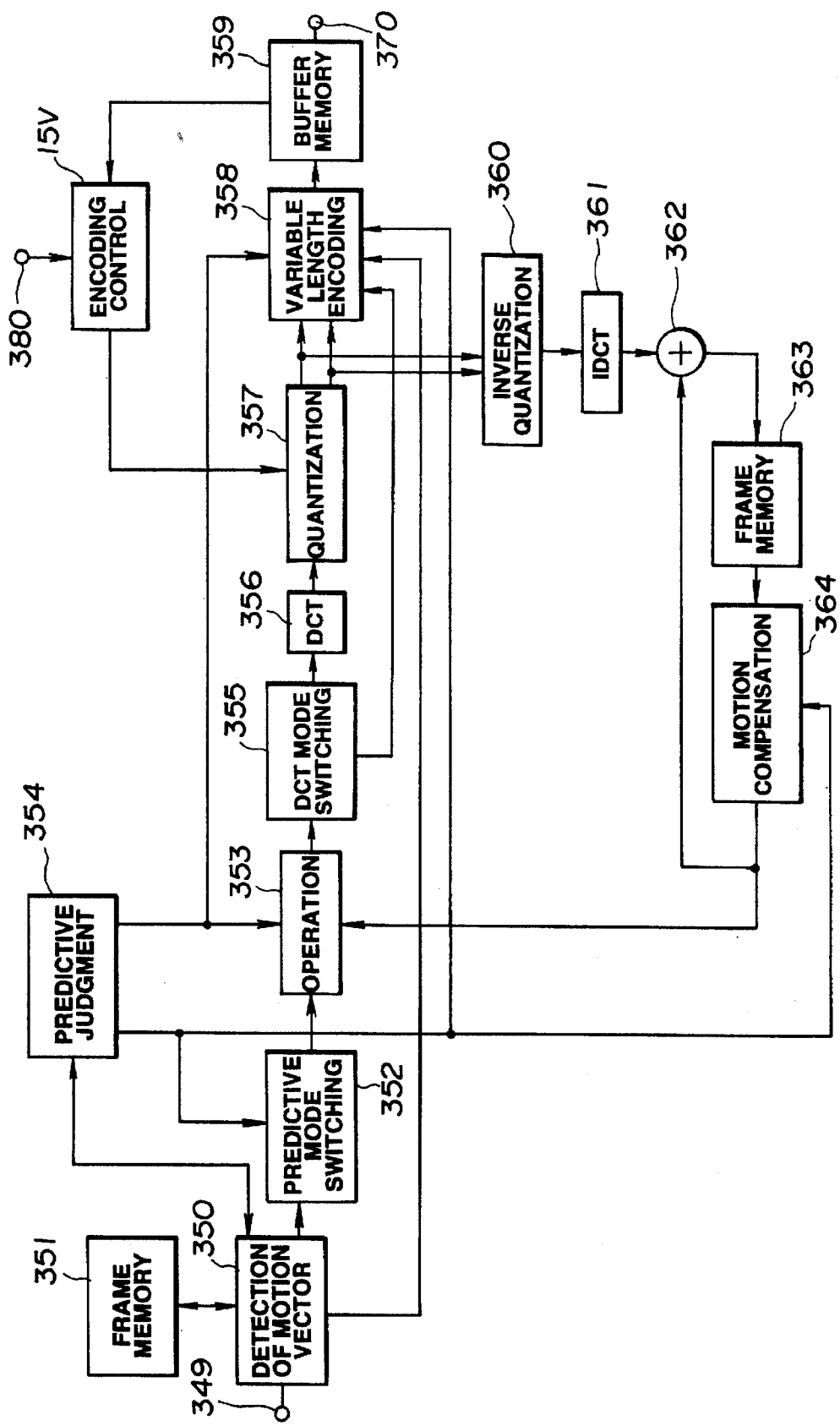
FIG. 14 is a circuit diagram showing, in a block form, another actual example of a compression encoding circuit for a video signal.

Another example of compression encoding of the video signal will now be described with reference to FIG. 14. In the example of FIG. 14, MPEG (storage moving picture encoding) is employed as a representative encoding system of moving picture. This system is discussed in ISO-IEC/ JTC1/SC2/WG11 and is proposed as the standard proposal. Hybrid system in which motion compensated predictive encoding and DCT (Discrete Cosine Transform) encoding are combined is adopted.

In FIG. 14, picture data to be encoded delivered to input terminal 11V of FIG. 1 is inputted to motion vector detecting circuit 350 in macro block units through input terminal 349. Motion vector detecting circuit 350 processes picture data of respective frames as any one of I picture (Intra-coded picture), P picture (Predictive-coded picture) and B picture (Bidirectional coded picture) in accordance with a predetermined sequence set in advance. Pictures of respective frames sequentially inputted are processed as any picture types of I, P, B determined in advance.

Picture data of frame processed as I picture is transferred from motion vector detecting circuit 350 into forward original picture area within frame memory 351, and is stored thereinto. Picture data of frame processed as B picture is transferred to original picture area (reference original picture area), and is stored thereinto. Picture data of frame processed as P picture is transferred to backward original picture area, and is stored thereinto.

At the subsequent timing, when picture of frame to be processed as B picture or P picture is further inputted, the first picture data of P picture which was stored in the backward original picture area up to that time is transferred to forward original picture area, the next picture data of B picture is stored (overwritten) into original picture area, and the next picture data of P picture is stored (overwritten) into backward original picture area. Such an operation is sequentially repeated.

Signals of respective pictures stored in frame memory 351 are read out therefrom. At predictive mode switching circuit 352, frame predictive mode processing or field predictive mode processing is carried out. Further, under control of predictive judging circuit 354, at operation section 353, operation by intra-cording mode, forward predictive mode, backward predictive mode, or bidirectional predictive mode is carried out. Which any one of these processing is carried out is determined in macro block units in correspondence with predictive error signal (difference between reference picture subject to processing and a predictive picture corresponding thereto). To realize this, motion vector detecting circuit 350 generates, in macro block units, absolute value sum (or square sum) of predictive error signals used for this judgment and evaluation values of intra coding mode corresponding to those predictive error signals.

Here, in the case where frame predictive mode is set, predictive mode switching circuit 352 outputs four luminance blocks delivered from motion vector detecting circuit 350 to operation section 353 of the succeeding stage as they are. In this frame predictive mode, prediction is carried out with four luminance blocks (macro block) being as a unit, and one motion vector is caused to correspond to four luminance blocks.

On the contrary, in the case where field predictive mode is set, predictive mode switching circuit 352 implements, to signal inputted from motion vector detecting circuit 350, a processing such that two luminance blocks of four luminance blocks are caused to, e.g., consist of only dots of lines of odd field and the other two luminance blocks are caused to consist of data of lines of even field to output the signal thus processed to operation section 353. In this case, one motion vector is caused to correspond to two luminance blocks consisting of odd field, and the other one motion vector is caused to correspond to two luminance blocks consisting of even field.

With respect to color difference signal, in the case of the frame predictive mode, such color difference signal is delivered to operation section 353 in the state where data of lines of odd field and data of lines of even field are mixed. Moreover, in the case of the field predictive mode, upper halves (4 lines) of respective color difference blocks are caused to be color difference signal of odd field corresponding to luminance block of odd field, and lower halves (4 lines) are caused to be color difference signal of even field corresponding to luminance block of even field.

Further, motion vector detecting circuit 350 operates as follows. Namely, this circuit 350 generates, in macro block units, evaluation values of intra coding mode and absolute value sum of respective predictive errors for determining mode to be executed of intra coding mode, forward predictive mode, backward predictive mode and bidirectional predictive mode and processing to be executed of frame predictive mode and field predictive mode with respect to respective macro blocks at predictive judging circuit 354.

Namely, as evaluation value of intra coding mode, the motion vector detecting circuit 350 determines (calculates) absolute value sum |Aij-(mean value of Aij)| of differences between signals Aij of macro blocks of reference picture to be encoded from now on and their mean values. Moreover, the motion vector detecting circuit 850 determines (calculates), as absolute value sum of predictive errors of forward prediction, sum Σ|Aij-Bij| of absolute values |Aij-Bij| of differences (Aij-Bij) between signals Aij of macro blocks of reference picture and signals Bij of macro blocks of predictive picture. In addition, the motion vector detecting circuit 350 also respectively determines (calculates) absolute value sums of predictive errors of the backward prediction and the bidirectional prediction with respect to the cases of the frame predictive mode and the field predictive mode (their predictive pictures are changed to predictive pictures different from the case of the forward prediction) similarly to the case in the forward prediction.

These absolute value sums are delivered to predictive judging circuit 354. This predictive judging circuit 354 selects, as absolute value sum of predictive errors of inter prediction, the minimum one of absolute value sums of predictive errors of forward prediction, backward prediction and bidirectional prediction in the frame predictive mode and the field predictive mode. Further, the predictive judging circuit 354 compares the absolute value sum of predictive errors of the inter prediction and evaluation value of intra encoding mode to select smaller one to select mode corresponding to the selected value as predictive mode and frame/field predictive mode. Namely, if the evaluation value of intra encoding mode is smaller, the intra coding mode is set. On the other hand, if absolute value sum of predictive errors of inter prediction is smaller, mode where corresponding absolute value sum is the minimum among forward prediction, backward prediction and bidirectional predictive mode is set as predictive mode and frame/field predictive mode.

As described above, predictive mode switching circuit 352 delivers signal of macro block of reference picture to operation section 353, as data corresponding to mode selected by predictive judging circuit 354 of frame and field predictive modes. Moreover, motion vector detecting circuit 350 outputs motion vector between predictive picture corresponding to predictive mode selected by predictive judging circuit 354 and reference picture to deliver it to variable length encoding (coding) circuit 358 and motion compensating circuit 364 which will be described later. It is to be noted that motion vector where absolute value sum of corresponding predictive error becomes minimum is selected as the motion vector.

Predictive judging circuit 354 sets intra coding mode (mode where no motion compensation is carried out) as predictive mode when motion vector detecting circuit 350 is reading picture data of I picture from the forward original picture area. Thus, picture data of I picture is inputted from operation section 353 to DCT mode switching circuit 355.

This DCT mode switching circuit 355 outputs, to DCT circuit 356, data of four luminance blocks in the state where lines of odd field and lines of even field are caused to be mixed (frame DCT mode), or they are caused to be separated (field DCT mode).

Namely, DCT mode switching circuit 355 compares encoding efficiency in the case where DCT processing is carried out with data of odd field and even field being mixed and encoding efficiency in the case where DCT processing is carried out with those data being separated to select mode of higher encoding efficiency.

For example, an input signal is caused to be of a structure such that lines of odd field and even field are mixed to calculate differences between signals of lines of odd field adjacent in upper and lower directions and signals of lines of even field similarly adjacent to further determine sum of those absolute values (square sum). Moreover, an input signal is caused to be of a structure such that lines of odd field and even field are separated to calculate differences between signals of lines of odd field adjacent in upper and lower directions and differences between signals of lines of even field to determine sums of respective absolute values (or square sums). Further, the both sums (absolute value sums) are compared to set DCT mode corresponding to smaller value. Namely, if the former is smaller, frame DCT mode is set. In contrast, if the latter is smaller, field DCT mode is set.

Data of structure corresponding to the selected DCT mode is outputted to DCT circuit 356, and DCT flag indicating the selected DCT mode is outputted to variable length encoding circuit 358.

As is clear from comparison between frame/field predictive mode in predictive mode switching circuit 352 and DCT mode in the DCT mode switching circuit 355, data structures in respective modes of the both are substantially the same with respect to luminance block.

In predictive mode switching circuit 352, in the case where frame predictive mode (mode where odd lines and even lines are mixed) is selected, there is high possibility that frame DCT mode (mode where odd lines and even lines are mixed) may be selected also in DCT mode switching circuit 355. Moreover, in the predictive mode switching circuit 352, in the case where field predictive mode (mode where data of odd field and even field are separated) is selected, there is high possibility that field DCT mode (mode where data of odd field and even field are separated) may be selected.

However, such selection is not necessarily carried out at all times. In predictive mode switching circuit 352, mode is determined so that absolute value sum of predictive errors becomes small. In DCT mode switching circuit 355, mode is determined so that encoding efficiency becomes satisfactory.

Picture data of I picture outputted from DCT mode switching circuit 355 is inputted to DCT circuit 356. Thus, such picture data is caused to undergo DCT processing so that it is transformed into DCT coefficients. Such DCT coefficient data is inputted to quantizing circuit 357, at which quantization is implemented thereto at quantization step based on data storage quantity (buffer storage quantity) of transmitting buffer 359 corresponding to the buffer memory 13V and control signal in which the activity determined by the encoding control circuit 15V supplied with signal from the synthesis circuit 44 of FIG. 1 through terminal 380 is taken into consideration. Thereafter, the data thus quantized is inputted to variable length encoding circuit 358.

The variable length encoding circuit 358 transforms picture data (data of I picture in this case) delivered from quantizing circuit 357 into variable length code, e.g., Huffman code, etc. in correspondence with quantization step (scale) delivered from quantizing circuit 357 to output it to transmitting buffer 359.

The variable length encoding circuit 358 is also supplied with quantization step (scale) from quantizing circuit 357, predictive mode (mode indicating which mode of intra coding mode, forward predictive mode, backward predictive mode and bidirectional predictive mode is set) from predictive judging circuit 354, motion vector from motion vector detecting circuit 350, predictive flag (flag indicating which frame predictive mode or field predictive mode is set) from predictive judging circuit 354, and DCT flag (flag indicating which frame DCT mode or field DCT mode is set) that DCT mode switching circuit 355 outputs. They are also caused to undergo variable length encoding.

Transmitting buffer 359 temporarily stores inputted data to output data corresponding to storage quantity to quantizing circuit 357 through the encoding control circuit 15V.

Data stored in the transmitting buffer 359 is read out at a predetermined timing, and is outputted to transmission path through output terminal 369.

On the other hand, data of I picture outputted from quantizing circuit 357 is inputted to inverse quantizing circuit 360, and is inverse-quantized in correspondence with quantization step delivered from quantizing circuit 357. Output of the inverse quantizing circuit 360 is inputted to IDCT (Inverse DCT) circuit 361, and is caused to undergo inverse DCT processing. The data thus processed is delivered to forward predictive picture area of frame memory 363 through operation element 362, and is stored thereinto.

Meanwhile, in the case where motion vector detecting circuit 350 respectively processes picture data of respective frames sequentially inputted, e.g., as pictures of I, B, P, B, P, B, it processes picture data of frame initially inputted as I picture thereafter to process, prior to processing picture of frame subsequently inputted as B picture, picture data of frame further subsequently inputted as P picture. This is because if P picture is prepared in advance as backward predictive picture since B picture may be subject to backward prediction and bidirectional prediction, it is unable to decode such B picture.

In view of the above, the motion vector detecting circuit 350 starts processing of picture data of P picture stored in backward original picture area of frame memory 363 subsequently to processing of I picture. Then, similarly to the above-described case, evaluation values of intra coding mode and absolute value sum of interframe differences (predictive errors) in macro block units are delivered from motion vector detecting circuit 350 to predictive judging circuit 354. Predictive judging circuit 354 sets, in macro block units, any one of frame predictive mode and field predictive mode, and any one of mode of intra coding mode and forward predictive mode in correspondence with evaluation value of intra coding mode and absolute value sum of predictive errors of macro block of P picture.

Operation section 353 sends, when intra coding mode is set, data thereof to DCT mode switching circuit 355 similarly to data of I picture to transmit it to transmission path through DCT circuit 356, quantizing circuit 357, variable length encoding circuit 358 and transmitting buffer (labeled buffer memory in the figure) 359. Moreover, this data is delivered to backward predictive picture area of frame memory 363 through inverse quantizing circuit 360, IDCT circuit 361 and operation element 362, and is stored thereinto.

On the other hand, when forward predictive mode is set, picture (picture of I picture in this case) data stored in forward predictive picture area of frame memory 383 is read out, and is motion-compensated by motion compensating circuit 384 in correspondence with motion vector that motion vector detecting circuit 350 outputs. Namely, motion compensating circuit 384 reads out, when setting of forward predictive mode is instructed from predictive judging circuit 354, data with readout address of forward predictive area of frame memory 383 being shifted by distance corresponding to motion vector from position corresponding to position of macro block that motion vector detecting circuit 350 is now outputting, thus to generate predictive picture data.

Predictive picture data outputted from motion compensating circuit 384 is delivered to operation element 353. This operation element 353 subtracts predictive picture data corresponding to macro block, which is delivered from motion compensating circuit 364, from data of macro block of reference picture delivered from predictive mode switching circuit 352 to output its difference (predictive error).

This difference data is transmitted to transmission path through DCT mode switching circuit 355, DCT circuit 358, quantizing circuit 357, variable length encoding circuit 358 and transmitting buffer 359. Moreover, this difference data is locally decoded by inverse quantizing circuit 380 and IDCT circuit 381. The data thus decoded is inputted to operation element 362.

This operation element 362 is also supplied with the same data as predictive picture data delivered to the operation element 353. This operation element 362 adds predictive picture data that motion compensating circuit 364 outputs to difference data that IDCT circuit 361 outputs. Thus, picture data of original (decoded) P picture is obtained. This picture data of P picture is delivered to backward predictive picture area of frame memory 363, and is stored thereinto. It is to be noted that since it is necessary that data structure of difference data that IDCT circuit outputs, which is delivered to operation element 362 and data structure of predictive picture data are the same in practice, a circuit for carrying out sequencing of data is required in preparation for the case where frame/field predictive mode and frame/field DCT mode are different, but description thereof is omitted for brevity.

After data of I picture and P picture are respectively stored into forward predictive picture area and backward predictive picture area of frame memory 363 in a manner as stated above, motion vector detecting circuit 350 then executes processing of B picture. Predictive judging circuit 354 sets frame/field predictive mode in correspondence with magnitudes of evaluation value of intra coding mode and absolute value sum of interframe differences in macro block units, and sets predictive mode to any one of intra coding mode, forward predictive mode, backward predictive mode and bidirectional predictive mode.

As described above, when intra coding mode or forward predictive mode is set, processing similar to the case of P picture is carried out. Thus, data is transmitted.

On the contrary, when backward predictive mode is set, picture (picture of P picture in this case) stored in backward predictive picture area of frame memory 383 is read out. The picture thus read out is motion-compensated by motion compensating circuit 384 in correspondence with motion vector that motion vector detecting circuit 350 outputs. Namely, motion compensating circuit 384 reads out, when setting of backward predictive mode is instructed from predictive judging circuit 354, data with readout address of backward predictive picture area of frame memory 383 being shifted by distance corresponding to motion vector from position corresponding to position of macro block that motion vector detecting circuit 350 is now outputting, thus to generate predictive picture data.

Predictive picture data outputted from motion compensating circuit 384 is delivered to operation element 353. This operation element 353 subtracts predictive picture data delivered from motion compensating circuit 384 from data of macro block of reference picture delivered from predictive mode switching circuit 352 to output its difference. This difference data is transmitted to transmission path through DCT mode switching circuit 355, DCT circuit 358, quantizing circuit 357, variable length encoding circuit 358 and transmitting buffer 359.

When bidirectional predictive mode is set, picture (picture of I picture in this case) data stored in forward predictive picture area and picture (picture of P picture in this case) stored in backward predictive picture area of frame memory 363 are read out, and are motion-compensated in correspondence with motion vector that motion vector detecting circuit 350 outputs by motion compensating circuit 364. Namely, motion compensating circuit 364 reads out, when setting of bidirectional predictive mode is instructed from predictive judging circuit 354, data with readout addresses of forward predictive picture area and backward predictive picture area of frame memory 363 being shifted by motion vectors (in this case, two motion vectors for forward predictive picture and backward predictive picture in the case of frame predictive mode, and four motion vectors in total of two motion vectors for forward predictive picture and two motion vectors for backward predictive picture in the case of field predictive mode) from position corresponding to position of macro block that motion vector detecting circuit 350 is now outputting, thus to generate predictive picture data.

Predictive picture data outputted from motion compensating circuit 364 is delivered to operation element 353. This operation element 353 subtracts mean value of predictive picture data delivered from motion compensating circuit 364 from data of macro block of reference picture delivered from motion vector detecting circuit 350 to output its difference. This difference data is transmitted to transmission path through DCT mode switching circuit 355, DCT circuit 356, quantizing circuit 357, variable length encoding circuit 358, and transmitting buffer 359.

Since there is no possibility that picture of B picture is caused to be predictive picture of other picture, such picture is not stored into frame memory 363.

It should be noted that, in the frame memory 363, forward predictive picture area and backward predictive picture are caused to undergo bank switching as occasion demands so that picture data stored in one or the other picture area can be outputted selectively as forward predictive picture or backward predictive picture with respect to a predetermined reference picture.

While explanation has been given mainly in connection with luminance block, color difference block is similarly processed with macro block being as a unit, and is transmitted. It is to be noted that, as motion vector in the case of processing color difference block, there may be used motion vectors obtained by allowing motion vector of corresponding luminance block to be respectively one half in vertical and horizontal directions.

While stimulation levels of video signal and speech signal are detected as activities of these signals in the above-described embodiment, since these stimulations vary in dependency upon content of picture or sound, there may be employed an approach to determine, in dependency upon the content, the relationship between the characteristics of signals and allocated information quantity. For example, when there appears conspicuous sound such as chirping, etc. of little bird in silence, attention of the human being is drawn to chirping of that little bird, so stimulation level (activity) is considered to be great. Accordingly, at that time, even if picture information quantity is decreased, this is not conspicuous. It is to be noted that such allocated information quantity is set in advance on the basis of experience rule.

Figure 15:
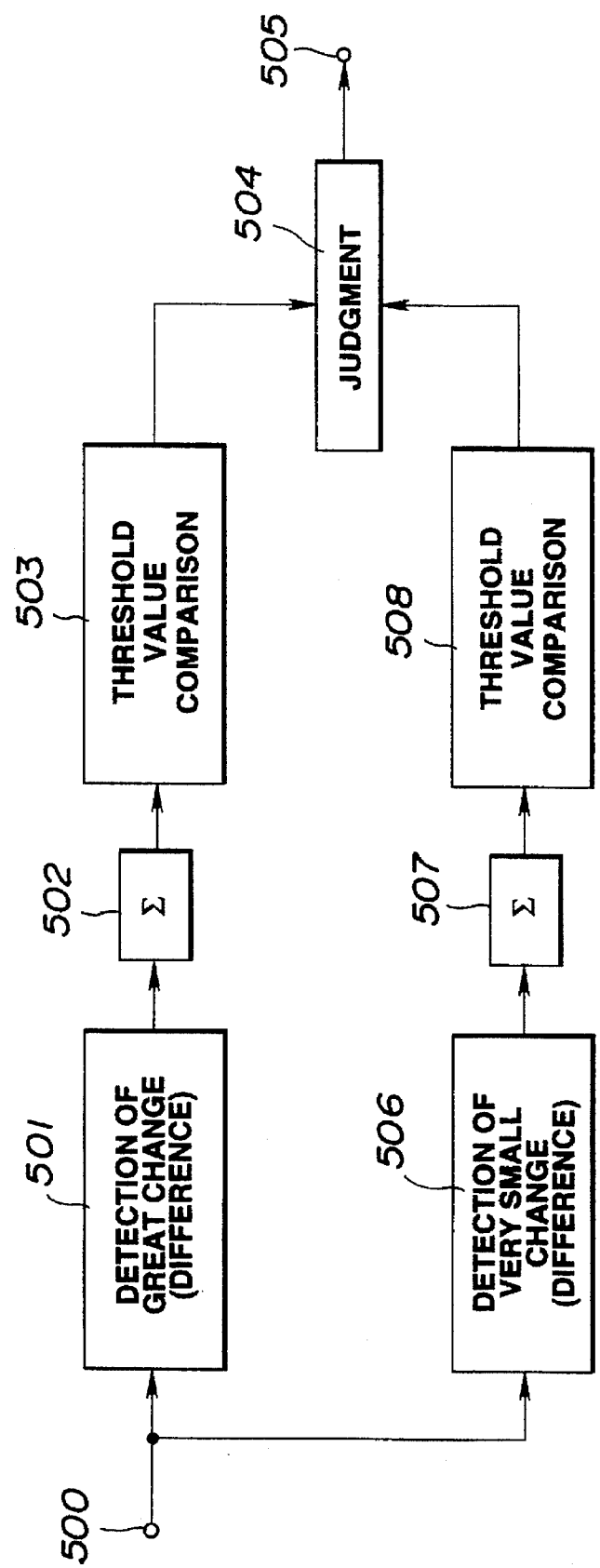
FIG. 15 is a circuit diagram showing, in a block form, the configuration of another actual example of an activity detecting circuit.

Activity detecting circuit 20 for video signal and activity detecting circuit 30 for speech signal may be constructed as shown in FIG. 15, for example. The configuration of FIG. 15 will now be described in connection with the case of video signal as an example. Since the fundamental operation in connection with the case of speech signal is also similar to the above, its explanation is omitted here.

In FIG. 15, terminal 500 is supplied with video signal from input terminal 11V, and this video signal is delivered to great change detecting circuit 501. This great change detecting circuit 501 determines difference value to sent only difference values more than a first predetermined value to calculating circuit 502 for calculating sum total of outputs thereof. The sum total of difference values calculated at the calculating circuit 502 is sent to comparing circuit 503, at which comparison with a predetermined threshold value is carried out. Signal indicating comparison result from the comparing circuit 503 is sent to judging circuit 504. Moreover, video signal delivered to the terminal 500 is also sent to very small change detecting circuit 508. This very small change detecting circuit 506 determines very small difference which is smaller than a second threshold value smaller than the first predetermined value of the delivered video signal. Calculating circuit 507 of the succeeding stage determines sum total of those very small differences. Comparing circuit 508 of the succeeding stage compares the sum total of very small differences and a predetermined threshold value to send signal indicating comparison result to judging circuit 504. This judging circuit 504 carries out judgment as to whether or not activity exists on the basis of signals from the two comparing circuits 503 and 508 to output signal indicating presence or absence of existence of activity from terminal 505.

When it is judged at threshold value comparing circuit 503 that input signal of threshold value comparing circuit is less than threshold value, and it is judged at threshold value comparing circuit 508 that input signal of threshold value comparison circuit 508 is more than threshold value, judging circuit 504 judges that activity is great. In actual terms, in the case of video signal, when the condition is as above, corresponding image indicates picture image which hardly change as a whole, but has movement in portion like image such that, e.g., it is dimly seen at a small scale that small animal is moving in the mist. In such a case, since viewing-listener draws attention to picture image, allocated bit number of video signal is caused to be increased. In addition, in the case of speech signal, when the condition is as above, it is indicated that there is chirping of little bird in silence as described above, for example.

While the example of determining difference is taken in FIG. 14, differentiation may be determined. In this case, differentiation is determined at great change detecting circuit 501 and very small change detecting circuit 506, and integrating operation is carried out at calculating circuits 503 and 507.

Moreover, while, in the above-mentioned embodiment, allocated bit number is variable to allow allocated information quantity to be variable, compression encoding system may be changed so that allocated bit numbers corresponding thereto are provided, thus to allow allocated information quantity to be variable.

As described above, in accordance with this invention, there is employed a scheme such that, in compression-encoding video signal and speech signal related thereto, in place of independently compression-encoding respective signals with characteristics of own signals being as criterion (reference), compression-encoding is carried out by taking into consideration characteristics at that time of both video signal and speech signal. Accordingly, it is possible to more efficiently compression-encode video signal and speech signal related thereto in the state of less degradation from a viewpoint of visual and auditory senses at the time of reproduction.

Namely, when stimulation as visual sense with respect to video signal for the human being is relatively stronger than stimulation by hearing sense by speech signal, noise of speech signal is apt to be masked. Thus, it is sufficient that information quantity of speech signal is small. In contrast, when there is such state that stimulation by sound is less than stimulation given from picture image, even if picture information has lesser information quantity, such sound does not become conspicuous. Thus, it becomes possible to carry out satisfactory information transmission of picture and sound with lesser information quantity.

What is claimed is:

1. An encoding apparatus adapted for respectively compression-encoding a digital video signal and a digital speech signal related thereto to transmit encoded signals, the apparatus comprising:

first characteristic detecting means for detecting the characteristic of the digital video signal;

second characteristic detecting means for detecting the characteristic of the digital speech signal;

synthesizing means for synthesizing outputs of the first and second characteristic detecting means; and control means for controlling allocated information quantities of compression encoding of the digital video signal and the digital speech signal on the basis of an output of the synthesizing means.

2. An encoding apparatus as set forth in claim 1, wherein the first and second characteristic detecting means respectively detect activities of a video signal and a speech signal.

3. An encoding apparatus as set forth in claim 2, wherein the activity is detected by detecting changes in point of space and/or time.

4. An encoding apparatus as set forth in claim 3, wherein the first characteristic means comprises a frame memory for frame-delaying a digital video signal, a line memory for line-delaying the digital video signal, a sample memory for sample-delaying the digital video signal, first difference calculating means for calculating a difference between the frame-delayed digital video signal from the frame memory and an input digital video signal, second difference calculating means for calculating a difference between the line-delayed digital video signal from the line memory and the input digital video signal, and third difference calculating means for determining a difference between the sample-delayed digital video signal from the sample memory and the input digital video signal.

5. An encoding apparatus as set forth in claim 4, wherein the first characteristic detecting means includes non-linear synthesizing means for non-linearly synthesizing outputs of the first, second and third difference calculating means.

6. An encoding apparatus as set forth in claim 1, wherein there is provided a buffer memory for temporarily holding a compression-encoded signal thereafter to output it as an output signal, and wherein the control means controls allocated information quantities of compression encoding of the digital video signal and the digital speech signal in accordance with a quantity of information stored in the buffer memory and a synthesis output of the synthesizing means.

7. An encoding apparatus as set forth in claim 1, wherein the second characteristic detecting means comprises amplitude information generating means for generating amplitude information of an input digital speech signal, energy detecting means for detecting energy on the basis of amplitude value information from the amplitude information generating means, and convolution operation means for implementing convolution operation to an output of the energy detecting means.

8. An encoding apparatus as set forth in claim 1, wherein the synthesizing means respectively multiplies respective outputs of the first and second characteristic detecting means by predetermined coefficients thereafter to synthesize them.

9. An encoding apparatus as set forth in claim 1, wherein the first characteristic detecting means and the second charteristic detecting means respectively comprise great change quantity detecting means for detecting great change of signal, first comparing means for comparing an output of the great change quantity detecting means with a predetermined threshold value, very small change detecting means for detecting very small change of signal, second comparing means for comparing an output of the very small change quantity detecting means with a predetermined threshold value, and judging means for judging from outputs of the first and second comparison means whether or not activity exists.

10. An encoding method of respectively compression-encoding a digital video signal and a digital speech signal related thereto to transmit them, the method comprising the steps of:

detecting the characteristic of the digital video signal;

detecting the characteristic of the digital speech signal;

synthesizing a characteristic detection output of the digital video signal and a characteristic detection output of the digital speech signal; and controlling allocated information quantities of compression encoding of the digital video signal and the digital speech signal on the basis of the synthesis output.

11. An encoding method as set forth in claim 10, wherein, at detections of the characteristics of the digital video signal and the digital speech signal, activities of the video signal and the speech signal are respectively detected.

12. An encoding method as set forth in claim 11, wherein the activity is detected by detecting changes in point of space and/or time of signal.

* * * * *